(12) United States Patent
Leung et al.

(10) Patent No.: US 7,409,549 B1
(45) Date of Patent: Aug. 5, 2008

(54) METHODS AND APPARATUS FOR DYNAMIC HOME AGENT ASSIGNMENT IN MOBILE IP

(75) Inventors: Kent K. Leung, Mountain View, CA (US); Madhavi W. Chandra, Apex, NC (US); Alpesh Patel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 10/015,247

(22) Filed: Dec. 11, 2001

(51) Int. Cl.
*H04L 9/00* (2006.01)
*H04K 1/00* (2006.01)

(52) U.S. Cl. .................... 713/168; 726/14; 380/270
(58) Field of Classification Search ................ 380/277, 380/281; 713/171; 709/227; 726/14
See application file for complete search history.

(56) References Cited

U.S. PATENT DOCUMENTS

| | | |
|---|---|---|
| 4,692,918 A | 9/1987 | Elliott et al. |
| 5,016,244 A | 5/1991 | Massey et al. |
| 5,018,133 A | 5/1991 | Tsukakoshi et al. |
| 5,159,592 A | 10/1992 | Perkins |
| 5,218,600 A | 6/1993 | Schenkyr et al. |
| 5,371,852 A | 12/1994 | Attanasio et al. |
| 5,442,633 A | 8/1995 | Perkins et al. |
| 5,457,736 A | 10/1995 | Cain et al. |
| 5,473,599 A | 12/1995 | Li et al. |

(Continued)

FOREIGN PATENT DOCUMENTS

| | | | |
|---|---|---|---|
| EP | 1058421 | | 12/2000 |
| EP | 1134991 | | 9/2001 |
| WO | WO 01/06734 | | 1/2001 |
| WO | WO 01/26322 | * | 4/2001 |
| WO | 2004049672 A2 | * | 6/2004 |
| WO | WO 2004/049672 A2 | * | 6/2004 |

OTHER PUBLICATIONS

Jue J.P. et al., "Design and Analysis of a Replicated Server Architecture for Supporting IP-Host Mobility", Mobile Computing and Communications Review, ACM, NY, NY, vol. 2, No. 3, Jul. 1, 1998, pp. 16-23, XP000768934 ISSN: 1091-1669 abstract.

(Continued)

*Primary Examiner*—Christopher A Revak
(74) *Attorney, Agent, or Firm*—Weaver Austin Villeneuve & Sampson LLP

(57) ABSTRACT

Methods and apparatus are disclosed that enable a Home Agent to be dynamically assigned to a mobile node. A Mobility Agent supporting Mobile IP enables a mobile node to be registered with either the Mobility Agent or another "local" Home Agent, by receiving a registration request packet from the Mobile Node indicating that a key to be shared by the Mobile Node and an agent with which the Mobile Node is registering is requested. In addition, the agent with which the Mobile Node is registering (e.g., local Home Agent) may be assigned. For instance, a local Home Agent may be assigned if load balancing among multiple Home Agents is desired. A key to be shared by the Mobile Node and the agent with which the Mobile Node is registering is obtained. The key to be shared by the Mobile Node and the agent with which the Mobile Node is registering is then stored. A registration reply packet is then sent to the mobile node including the key to be shared by the Mobile Node and the agent with which the Mobile Node is registering. The mobile node may then re-register with the agent (e.g., local Home Agent) using the key.

67 Claims, 20 Drawing Sheets

U.S. PATENT DOCUMENTS

| | | | |
|---|---|---|---|
| 5,572,528 | A | 11/1996 | Shuen |
| 5,659,544 | A | 8/1997 | La Porta et al. |
| 5,793,762 | A | 8/1998 | Penners et al. |
| 5,901,352 | A | 5/1999 | St-Pierre et al. |
| 6,137,791 | A | 10/2000 | Frid et al. |
| 6,144,671 | A | 11/2000 | Perinpanathan et al. |
| 6,160,804 | A | 12/2000 | Ahmed et al. |
| 6,167,513 | A * | 12/2000 | Inoue et al. ............... 713/150 |
| 6,195,705 | B1 * | 2/2001 | Leung ........................ 709/245 |
| 6,407,988 | B1 * | 6/2002 | Agraharam et al. ........ 370/328 |
| 6,421,714 | B1 * | 7/2002 | Rai et al. .................... 709/217 |
| 6,487,605 | B1 * | 11/2002 | Leung ........................ 709/245 |
| 6,567,664 | B1 * | 5/2003 | Bergenwall et al. ........ 455/403 |
| 6,651,105 | B1 * | 11/2003 | Bhagwat et al. ............ 709/239 |
| 6,707,809 | B1 | 3/2004 | Warrier et al. |
| 6,732,177 | B1 | 5/2004 | Roy |
| 6,771,623 | B2 | 8/2004 | Ton |
| 6,795,705 | B1 | 9/2004 | Warrier et al. |
| 6,839,338 | B1 | 1/2005 | Amara et al. |
| 6,856,624 | B2 | 2/2005 | Magret |
| 6,970,443 | B2 * | 11/2005 | Dynarski et al. ............ 370/338 |
| 6,987,771 | B2 | 1/2006 | Shimizu et al. |
| 7,003,282 | B1 * | 2/2006 | Ekberg ........................ 455/411 |
| 7,065,067 | B2 * | 6/2006 | Song et al. .................. 370/338 |
| 7,069,015 | B2 | 6/2006 | Veerepalli et al. |
| 2001/0012777 | A1 | 8/2001 | Igarashi et al. |
| 2001/0021175 | A1 | 9/2001 | Haverinen |
| 2002/0009066 | A1 | 1/2002 | Shimizu et al. |
| 2002/0026527 | A1 * | 2/2002 | Das et al. .................... 709/245 |
| 2002/0039367 | A1 | 4/2002 | Seppala et al. |
| 2002/0065785 | A1 * | 5/2002 | Tsuda ........................ 705/67 |
| 2002/0080752 | A1 | 6/2002 | Johansson et al. |
| 2002/0114323 | A1 * | 8/2002 | Chowdhury et al. ........ 370/352 |
| 2002/0114469 | A1 * | 8/2002 | Faccin et al. ................ 380/270 |
| 2003/0016655 | A1 | 1/2003 | Gwon |
| 2003/0018810 | A1 | 1/2003 | Karagiannis et al. |
| 2003/0073439 | A1 | 4/2003 | Wenzel et al. |
| 2003/0147537 | A1 | 8/2003 | Jing et al. |
| 2003/0182433 | A1 | 9/2003 | Kulkarni et al. |
| 2004/0029584 | A1 * | 2/2004 | Le et al. .................. 455/432.1 |
| 2004/0174876 | A1 | 9/2004 | Peirce et al. |
| 2004/0184420 | A1 | 9/2004 | Xu et al. |
| 2004/0202126 | A1 | 10/2004 | Leung et al. |
| 2005/0025091 | A1 * | 2/2005 | Patel et al. ................... 370/328 |
| 2005/0198506 | A1 * | 9/2005 | Qi et al. ....................... 713/170 |
| 2006/0072759 | A1 * | 4/2006 | Gundavelli et al. .......... 380/270 |
| 2006/0104247 | A1 * | 5/2006 | Dommety et al. ........... 370/338 |
| 2008/0002684 | A1 * | 1/2008 | Kumazawa et al. ......... 370/389 |

OTHER PUBLICATIONS

Hunt G.D.H. et al., "Network Dispatcher: a connection router for scalable Internet services" Computer Networks and ISDN Systems, North Holland Publishing. Amsterdam, NL, vol. 30, No. 1-7, Apr. 1, 1998, pp. 347-357, XP004121412 ISSN: 0169-7552.

International Search Report, Application No. PCT/US03/13926, Mailed Aug. 22, 2003 (CISCP287.WO).

International Search Report, Application No. PCT/US03/02828, Mailed Sep. 5, 2003 (CISCP271.WO).

Examiner's Communication pursuant to Article 96(2) EPC dated May 12, 2006 from European Patent Application No. 03715961.3 (CISCP271.EP).

International First OA, Chinese Pat Application No. 03800009.1, Office Action issued Oct. 14, 2005 (CISCP271.CN).

Release notes for 3Com Corporation, "Conducting a Redundant Route for Network Resiliency," Mar. 1994, *NET Builder Family Bridge/Router* pp. 26-29.

J. Moy, RFC 1247 "OSPF Version 2," Jul. 19, 1991.

D. Oran, RFC 1142 "OSI IS-IS Intra-domain Routing Protocol," Feb. 1990.

Uyless Black, "TCP/IP and Related Protocols," 1992, *McGraw-Hill, Inc.*, pp. 226-249.

T. Li, et al., RFC 2281 "Cisco Hot Standby Router Protocol (HSRP)," Mar. 1998.

Chambless, et al., "Home Agent Redundancy Protocol (HARP)," Oct. 27, 1997.

C. Perkins, "*IP Mobility Support*," RFC2002, IBM Corporation, Oct. 1996.

"*Mobile IP*," Release 12.0(1)T, pp. 1-55, no date provided.

Montenegro, G., "*Reverse Tunneling for Mobile IP*," RFC 2344, Sun Microsystems, Inc., pp. 1-19, May 1998.

D. Harkins and D. Carrel, "*The Internet Key Exchange(IKE)*," Cisco Systems, pp. 1-33, Jun. 1998.

D. Cong and M. Hamlen, and C. Perkins, "*The Definitions of Managed Objects for IP Mobility Support using SMIv2*," RFC2006, Motorola and IBM, pp. 1-52, Oct. 1996.

Perkins and Calhoun, "Generalized Key Distribution Extensions for Mobile IP" draft-ietf-mobileip-gen-key-01.txt,, Mobile IP Working Group, Internet Draft, Aug. 27, 2001, 9 pages.

C. Finseth, "*An Access Control Protocol, Sometimes Called TACACS*," RFC1492, pp. 1-15, Sep. 13, 1992.

D. Carrel and Lol Grant, "*The TACACS+ Protocol*," Network Working Group, Internet-Draft, Cisco Systems, pp. 1-42, Jan. 1997.

C. Rigney, "*RADIUS Accounting*," RFC 2139, Livingston, pp. 1-25, Apr. 1997.

C. Rigney, et al., "*Remote Authentication Dial in User Service(RADIUS)*," RFC 2138, pp. 1-65 Apr. 1997.

Aboba and Beadles, "*The Network Access Identifier*" RFC 2486, Jan. 1999.

Calhoun and Perkins, "*Mobile IP Network Access Identifier Extension*", Jan. 12, 2000.

Postel, J., "*Simple Mail Transfer Protocol*", STD 10, RFC821, Aug. 1982.

Crocker, D. and P. Overrell, "*Augmented BNF For Syntax Specifications: ABNF*", RFC 2234, Nov. 1997.

Perkins C: RFC 2002, IP Mobility Support, Request for Comments, Oct. 1996, XP002222715 Retrieved from the Internet: URL:http://www.ietf.org/rfc/rfc2002.txt?number=2002 retrieved on Nov. 28, 2002.

Perkins c: "RFC 2002: IP Mobility Support", Request for Comments, Oct. 1996, XP002187650, Retrieved from the Internet:: URL:http://www.isi.edu/in-notes/rfc2002.txt, retrieved on Jan. 17, 2002.

Jue J.P. et al., "Design and Analysis of Replicated Servers to Support IP-Host Mobility in Enterprise Networks" Communications, 1997, ICC 97 Montreal Towards the Knowledge Millennium, 1997, IEEE International Conference on Montreal, Que., Canada Jun. 8-12, 1997, New York, NY, USA, IEEE, US, Jun. 8, 1997, pp. 1256-1260, XP010226957.

U.S. Office Action dated May 19, 2005 from related U.S. Appl. No. 10/084,698 (CISCP271).

U.S. Office Action dated Nov. 18, 2005 from related U.S. Appl. No. 10/084,698 (CISCP271).

U.S. Office Action dated Feb. 17, 2006 from related U.S. Appl. No. 10/084,698 (CISCP271).

U.S. Office Action dated Jul. 17, 2006 from related U.S. Appl. No. 10/084,698 (CISCP271).

Notice of Allowance dated Jun. 1, 2007 and Allowed Claims from related U.S. Appl. No. 10/084,698 (CISCP271).

U.S. Office Action dated Jun. 6, 2005 from related U.S. Appl. No. 10/139,941 (CISCP287).

U.S. Office Action dated Sep. 29, 2005 from related U.S. Appl. No. 10/139,941 (CISCP287).

U.S. Office Action dated Apr. 6, 2006 from related Appl. No. 10/139,941 (CISCP287).

U.S. Office Action dated Sep. 8, 2006 from related U.S. Appl. No. 10/139,941 (CISCP287).

U.S. Office Action dated Apr. 6, 2007 from related U.S. Appl. No. 10/139,941 (CISCP287).

EP Office Action dated Mar. 13, 2007 from related European Application No. 03724437.3 (CISCP287.EP).

* cited by examiner

Registration request

METHODS AND APPARATUS FOR DYNAMIC HOME AGENT ASSIGNMENT IN MOBILE IP

BACKGROUND OF THE INVENTION

1. Field of the Invention

The present invention relates to Mobile IP network technology. More particularly, the present invention relates to enabling dynamic Home Agent assignment in Mobile IP.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14).

Now, suppose that Mobile Node 6 wishes to send a message to a Correspondent Node 18 from its new location. An output message from the Mobile Node is then packetized and forwarded through Foreign Agent 10 over the internet 4 to Correspondent Node 18 (as indicated by the dotted line "packet from MN") according to a standard Internet Protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As indicated above, each mobile node has a designated Home Agent. As specified in RFC 2002, a mobile node is pre-configured with information identifying its Home Agent. In addition, both the mobile node and its Home Agent are also pre-configured with a shared key and Security Parameter Index (SPI) for the shared key, commonly referred to as a security association. Similarly, each Home Agent is pre-configured with information identifying mobile nodes that it supports as well as the corresponding security associations. In this manner, a mobile node is "anchored" to a specific Home Agent to enable it to subsequently register with that Home Agent and receive messages via that Home Agent from Correspondent Nodes.

There are various disadvantages associated with the pre-assignment of a specific Home Agent to a mobile node. For instance, the mobile node may be a cell phone that has been activated on the West Coast, and will therefore be assigned a Home Agent on the West Coast. However, the user of that cell phone may wish to travel to the East Coast. When the mobile node roams to a Foreign Agent, that Foreign Agent will therefore be on the East Coast. As a result, the communication path between the mobile node, located on the East Coast, and its pre-assigned Home Agent, located on the West Coast, is unnecessarily long.

Another disadvantage with pre-assignment of a specific Home Agent to each mobile node is the non-dynamic nature of such pre-assignments. As described above, each mobile node and Home Agent must be pre-configured with specific information anchoring each mobile node to a specific Home Agent. This requires the configuration information to be known ahead of time as well as manually configured for each device. Thus, even when there are multiple Home Agents on a single home network, since each Home Agent must be statically configured, it is impossible to dynamically distribute registration requests among the Home Agents. It would therefore be beneficial if a "lightly loaded" Home Agent could share the load of a "heavily loaded" Home Agent.

In view of the above, it would be desirable if a Home Agent could be dynamically assigned in Mobile IP.

SUMMARY OF THE INVENTION

The present invention enables a Home Agent to be dynamically assigned to a mobile node. The dynamic assignment enables a Home Agent that is "local" to a mobile node to be assigned. In this manner, the distance to a Home Agent associated with a particular mobile node may be minimized.

In accordance with one aspect of the invention, a Mobility Agent may function as a Foreign Agent or as a Home Agent. Thus, the Mobility Agent may provide service as a Home Agent. Alternatively, when load sharing is desired, the Mobility Agent may distribute a registration request to an assigned Home Agent (e.g., local Home Agent on the visiting network). In addition, the Mobility Agent may be in the same authentication domain (i.e., zone) as the mobile node, and therefore share a key with the mobile node. Alternatively, when the Mobility Agent is in a different authentication domain from the mobile node, the Mobility Agent and the mobile node do not share a key.

In accordance with one embodiment, when the Mobility Agent is in a different authentication domain from the mobile node, the Mobility Agent operates as a Home Agent when load sharing is not desired. When a registration request is received from the mobile node, once the registration request is authenticated, a key to be shared by the Mobility Agent and the mobile node is generated. The Mobility Agent creates a binding in a mobility binding table, stores the shared key, and sends a registration reply packet including the shared key to the mobile node. The mobile node then preferably re-registers with the Mobility Agent with this shared key.

In accordance with another embodiment, when the Mobility Agent is in a different authentication domain from the mobile node, the Mobility Agent may operate as a Foreign Agent to enable a mobile node to register with an assigned Home Agent (e.g., local Home Agent). When a registration request is received from the mobile node, once the registration request is authenticated, a key to be shared by an assigned Home Agent and the mobile node is generated. The Mobility Agent stores the shared key (temporarily) and sends a registration reply packet including the assigned Home Agent address and the shared key to the mobile node. The mobile node then re-registers with the assigned Home Agent with this shared key. This registration request is intercepted by the Mobility Agent, which adds the shared key to be used by the assigned Home Agent. When the assigned Home Agent receives the registration request, it extracts the key appended by the Mobility Agent and authenticates the registration request. When the assigned Home Agent sends a registration reply to the mobile node, the Mobility Agent as the Foreign Agent receives the registration reply, removes the key that it temporarily saved in memory, and forwards the registration reply to the mobile node.

In accordance with yet another embodiment, when the mobile node is in the same authentication domain as the Mobility Agent and load balancing is not desired, the Mobility Agent operates as a Home Agent. More particularly, the Mobility Agent shares a key with the mobile node. It therefore creates a binding in a mobility binding table when a registration request is received and authenticated, and sends a registration reply to the mobile node.

In accordance with yet another embodiment, when the mobile node is in the same authentication domain as the Mobility Agent, the Mobility Agent may operate as a Foreign Agent to enable a mobile node to register with an assigned Home Agent (e.g., local Home Agent). When a registration request is received from the mobile node, once the registration request is authenticated, a key to be shared by an assigned Home Agent and the mobile node is generated. The Mobility Agent stores the shared key (temporarily) and sends a registration reply packet including the shared key to the mobile node. The mobile node then re-registers with the assigned Home Agent with this shared key. This registration request is intercepted by the Mobility Agent, which adds the shared key to be used by the assigned Home Agent. When the assigned Home Agent receives the registration request, it also stores the shared key. When the assigned Home Agent sends a registration reply to the mobile node, the Mobility Agent as the Foreign Agent receives the registration reply, removes the key from memory, and forwards the registration reply to the mobile node.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
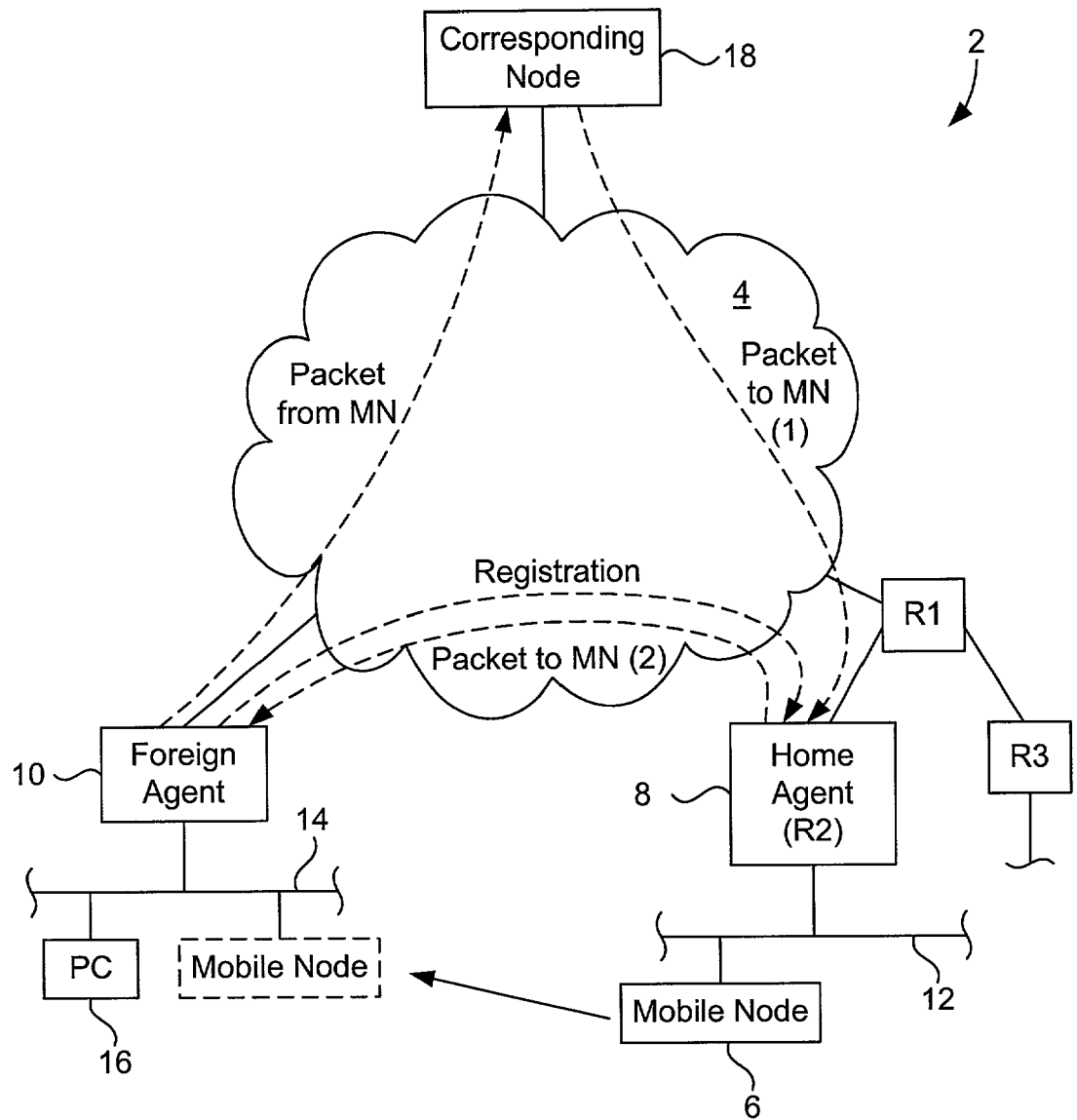
FIG. 1 is a diagram of a Mobile IP network segment and associated environment.
Figure 2:
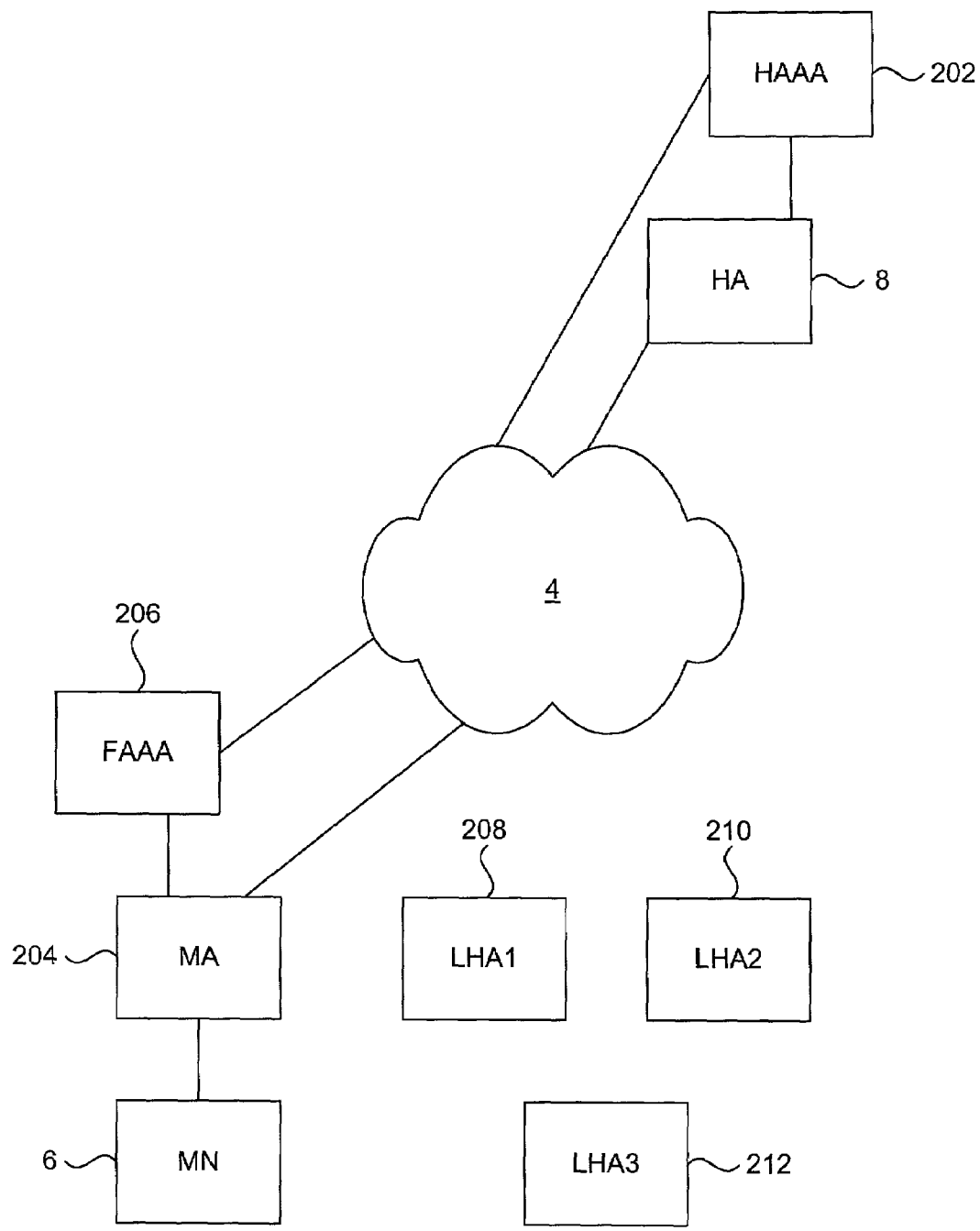
FIG. 2 is a diagram illustrating an exemplary system in which the present invention may be implemented.

FIG. 2 is a diagram illustrating an exemplary system in which the present invention may be implemented. As shown, Mobile Node 6 typically registers via the internet 4 with its Home Agent 8 when it roams to a Foreign Agent. However, the present invention enables the Mobile Node 6 to register with an alternate, dynamically assigned Home Agent. A security-association defines the key and the algorithm to be applied during the authentication process. As shown, security associations and keys shared by the Mobile Node and its Home Agent 8 may be stored in a separate network device adapted for authenticating the Mobile Node. More particularly, in addition to providing a network device or server which is capable of storing security-associations for one or more Home Agents, the centralized server may provide further services. By way of example, the centralized server may provide authentication services and/or authorization services. While authentication determines who an entity is, authorization determines what services a user is allowed to perform, or access. Various protocols such as the Remote Authentication Dial In User Service (RADIUS) and TACACS+ may be implemented to provide such a service. In addition, this protocol may similarly be implemented on each Home Agent that communicates with the server. RFC 2138 describes the RADIUS Protocol and is hereby incorporated by reference. Similarly, RFC 1492 describes TACACS and the Internet-Draft "The TACACS+Protocol Version 1.78," available at http://www.ietf.org/internet-drafts/draft-grant-tacacs-02.txt, describes TACACS+. Both of these documents are incorporated herein by reference for all purposes.

It is important to note that the server may provide conventional authentication and accounting services as well as authorization services. RADIUS and TACACS+conventionally provide authentication, authorization, and accounting services. Thus, these protocols are well suited for the servers of the present invention. However, the invention is not limited to these protocols. Other authentication, authorization, and accounting protocols may be used. In fact, any server that can safely store and provide security associations will be appropriate for this invention. For purposes of the present invention, the term AAA server will be used to refer to a server that can provide authorization and accounting services as well as authentication services.

In accordance with one embodiment, security associations (and therefore associated keys) are stored in an AAA server associated with the Home Agent 8, HAAA 202. A mobile node may therefore be authenticated by the AAA server. In addition, a Mobility Agent 204 functions as both a Home Agent and a Foreign Agent. As shown, the Mobility Agent 204 is located on the foreign network to which the Mobile Node 6 has roamed. When the Mobility Agent 204 receives a registration request from the Mobile Node 6, it indirectly authenticates the Mobile Node 6 through its local foreign AAA server, FAAA 206. More specifically, the FAAA 206 authenticates the Mobile Node 6 via the home AAA server, HAAA 202.

Once the registration request and the Mobile Node 6 has been authenticated, a key to be shared by the Mobile Node 6 and the assigned Home Agent is generated (e.g., by the HAAA 202) and provided to the Mobility Agent. This key is also provided to the Mobile Node 6 by the Mobility Agent 204 via a registration reply. The Mobile Node then re-registers with the assigned Home Agent with this key.

The assigned Home Agent may be a local Home Agent located on the visiting network, such as one of local Home Agents 208-212, or may be the Mobility Agent 204. In either case, the Mobility Agent 204, operating as a foreign agent, receives the second registration request. When the Mobility Agent 204 is the assigned Home Agent, the Mobility Agent 204 operates as a Home Agent to complete registration of the Mobile Node 6. However, when one of the local Home Agents 208-212 is the assigned Home Agent, the second registration request is forwarded to the appropriate local Home Agent with the key. The local Home Agent may then complete the registration process as the assigned Home Agent.

A Mobility Agent may share a key with the Mobile Node, and will therefore be in the same authentication domain as the Mobile Node. Alternatively, the Mobility Agent may not share a key with the Mobile Node, and will be in a different authentication domain from the Mobile Node. In addition, the Mobility Agent may act as the Home Agent when no load sharing is performed. Alternatively, load sharing may be performed by distributing registration requests among the local Home Agents. FIG. 3 through FIG. 6B illustrate the four different combinations of the above listed alternatives.

Figure 3:
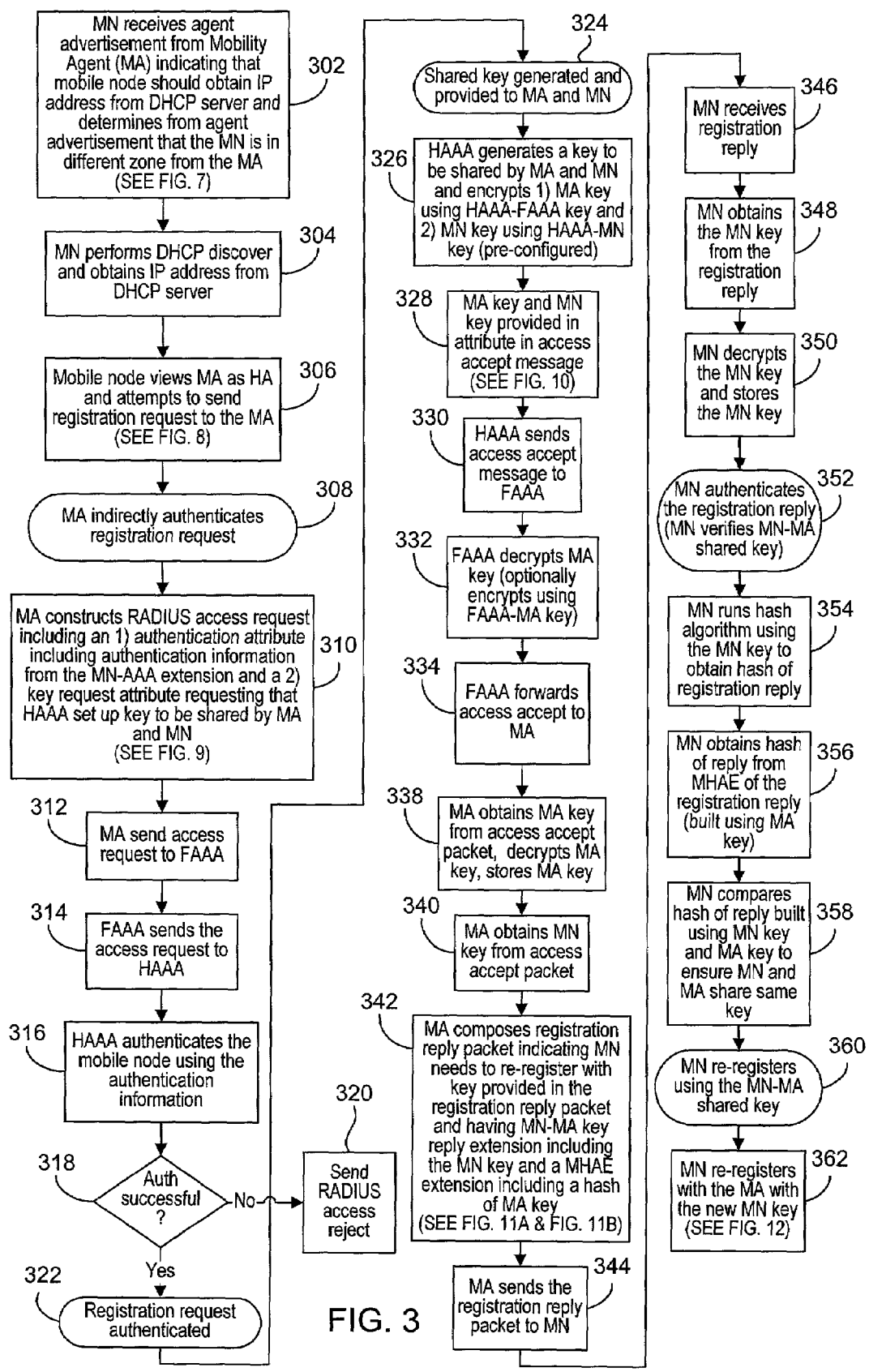
FIG. 3 is a process flow diagram illustrating a method of assigning a Home Agent to a mobile node in a different authentication domain from the Mobility Agent to which the mobile node has roamed in accordance with one embodiment.

FIG. 3 is a process flow diagram illustrating a method of assigning a Home Agent to a mobile node in a different authentication domain from the Mobility Agent to which the mobile node has roamed in accordance with one embodiment. In this embodiment, no load sharing is performed. As shown at block 302, an agent advertisement is received by the Mobile Node from the Mobility Agent. As will be described in further detail below with reference to FIG. 7, the agent advertisement indicates that the Mobility Agent is providing mobility services. More particularly, the agent advertisement preferably advertises its services as both a Home Agent and a Foreign Agent. In addition, the agent advertisement indicates a zone (i.e., authentication domain) associated with the Mobility Agent. The authentication domain is an area in which two entities or endpoints have the ability to authenticate one another. One example of an authentication domain is "@CISCO.com." Moreover, the agent advertisement may also indicate that the mobile node should obtain an IP address from either a Dynamic Host Configuration Protocol (DHCP) server or the Mobility Agent.

In this example, the mobile node determines from the agent advertisement that the mobile node is in a different zone from the Mobility Agent. In addition, the agent advertisement indicates that the mobile node should obtain an IP address from a DHCP server. In this case, the Mobility Agent will serve as the "local Home Agent," since the DHCP address acquired by the Mobile Node will be on the same subnet domain as the Mobility Agent. The mobile node then performs a DHCP discover and obtains an IP address from a DHCP server at block 304. Since the Mobility Agent advertises its services as a Home Agent, the mobile node sends a registration request to the Mobility Agent as its Home Agent at block 306. The registration request also has an authentication extension for authenticating the mobile node. In addition, the registration request may indicate that a key to be shared by the mobile node and an agent with which it is registering (e.g., Mobility Agent or dynamically assigned Home Agent) is requested. An exemplary registration request will be described in further detail below with reference to FIG. 8.

When the Mobility Agent receives the registration request, it authenticates the registration request indirectly at blocks 308-322. This may be accomplished through sending an access request to the appropriate network device. In one embodiment, a RADIUS access request is sent to the appropriate AAA server. As shown at block 310, the Mobility Agent constructs a RADIUS access request having an authentication attribute that includes authentication information from the authentication extension of the registration request. In addition, the access request includes a key request attribute that indicates that a key to be shared by the mobile node and the agent with which it is registering (e.g., Mobility Agent) is requested. An exemplary RADIUS access request packet will be described in further detail below with reference to FIG. 9. The Mobility Agent sends the access request to its local Foreign AAA server at block 312. The Foreign AAA server then sends the access request to the Home AAA server at block 314. More specifically, the access request will be sent to a Home AAA server associated with the Mobile Node identifier in the registration request. One method of implementing a Mobile Node identifier will be described in further detail below with respect to the Network Access Identifier (NA). The Home AAA server then authenticates the mobile node using the authentication information at block 316. If it is determined that the authentication is not successful at block 318, the Home AAA server sends a RADIUS access reject message at block 320. Otherwise, if authentication is successful, the registration request and the mobile node have been authenticated as shown at block 322.

A shared key for use by the mobile node and the assigned Home Agent (e.g., Mobility Agent) is then obtained. More particularly, in this instance, a shared key is generated and provided to the mobile node and the Mobility Agent 324, as shown and described with reference to blocks 326-344. In one embodiment, the key is generated by a Home AAA server at block 326. More particularly, the key that is to be shared by both the mobile node and the assigned Home Agent is provided as two keys to be separately transmitted to the mobile node and the assigned Home Agent. For instance, a first key (e.g., Mobility Agent key) is provided and preferably encrypted using a key shared by the Home AAA server and the Foreign AAA server. Similarly, a second key (e.g., mobile node key) is provided and preferably encrypted using a key shared by the Home AAA server and the mobile node. These two keys are then provided in separate attributes of an access accept message (e.g., RADIUS access accept message) as shown at block 328. An exemplary RADIUS access accept message will be described in further detail below with reference to FIG. 10.

Once the access accept packet is composed, the Home AAA server sends the access accept message to the Foreign AAA server at block 330. The Foreign AAA server may decrypt the Mobility Agent key and optionally encrypts the Mobility Agent key using a FAAA-MA key shared by the Foreign AAA server and the Mobility Agent at block 332. The Foreign AAA server then forwards the access accept message to the Mobility Agent at block 334. The Mobility Agent then obtains the shared key (e.g., Mobility Agent key) from the access accept packet at block 338, decrypts the Mobility Agent key, and stores the Mobility Agent key. The Mobility Agent then obtains the second identical key (e.g., mobile node key) from the access accept packet at block 340 so that it may later send the mobile node key to the mobile node in a registration reply packet.

Figure 11A:
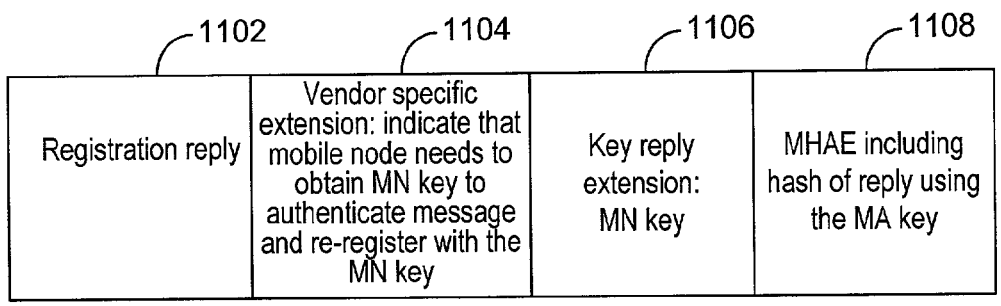
FIG. 11A is a diagram illustrating an exemplary registration reply that may be sent by a Mobility Agent as shown at block 342 of FIG. 3.
Figure 11B:
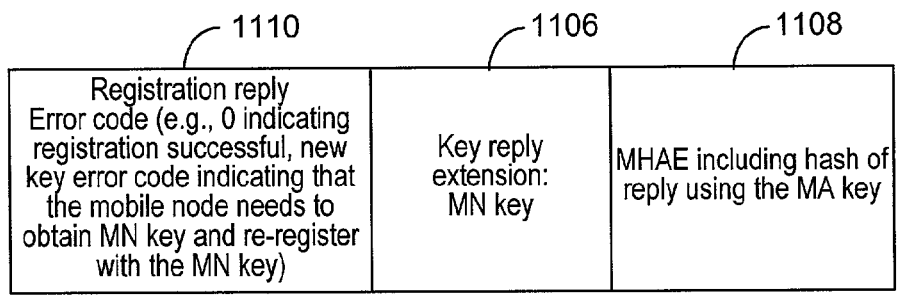
FIG. 11B is a diagram illustrating another exemplary registration reply that may be sent by a Mobility Agent as shown at block 342 of FIG. 3.

The Mobility Agent then composes a registration reply packet at block 342 such as that illustrated in FIG. 11A and FIG. 11B. More particularly, the registration reply packet indicates that the mobile node needs to re-register with the assigned Home Agent (e.g., Mobility Agent) with the key provided in the registration reply packet. More particularly, in one embodiment, the registration reply packet includes a MN-MA key reply extension including the mobile node key and a Mobile-Home Authentication (MHAE) Extension including a hash of the Mobility Agent key. The Mobility Agent then sends the registration reply packet to the mobile node at block 344.

When the mobile node receives the registration reply at block 346, it obtains the shared key (e.g., MN key) from the registration reply packet at block 348, decrypts and stores the MN key at block 350. The mobile node then authenticates the registration reply using the obtained "shared" key. In other words, the mobile node verifies that it shares the same key with the Mobility Agent at blocks 352-358. More particularly, the mobile node runs a hash algorithm using the MN key at block 354 to obtain a hash of the registration reply packet. The mobile node also obtains a hash of the registration reply packet from the MHAE of the registration reply packet, which was built using the MA key at block 356. The mobile node then compares the hash of the reply packet built by the MN key and the MA key at block 358 to ensure that the mobile node and the Mobility Agent share the same key.

Once authentication is completed, the mobile node preferably re-registers with the assigned Home Agent (e.g., Mobility Agent) with the newly received MN key as shown at blocks 360-362. An exemplary registration request packet that may be sent will be further described below with reference to FIG. 12.

Figure 4A:
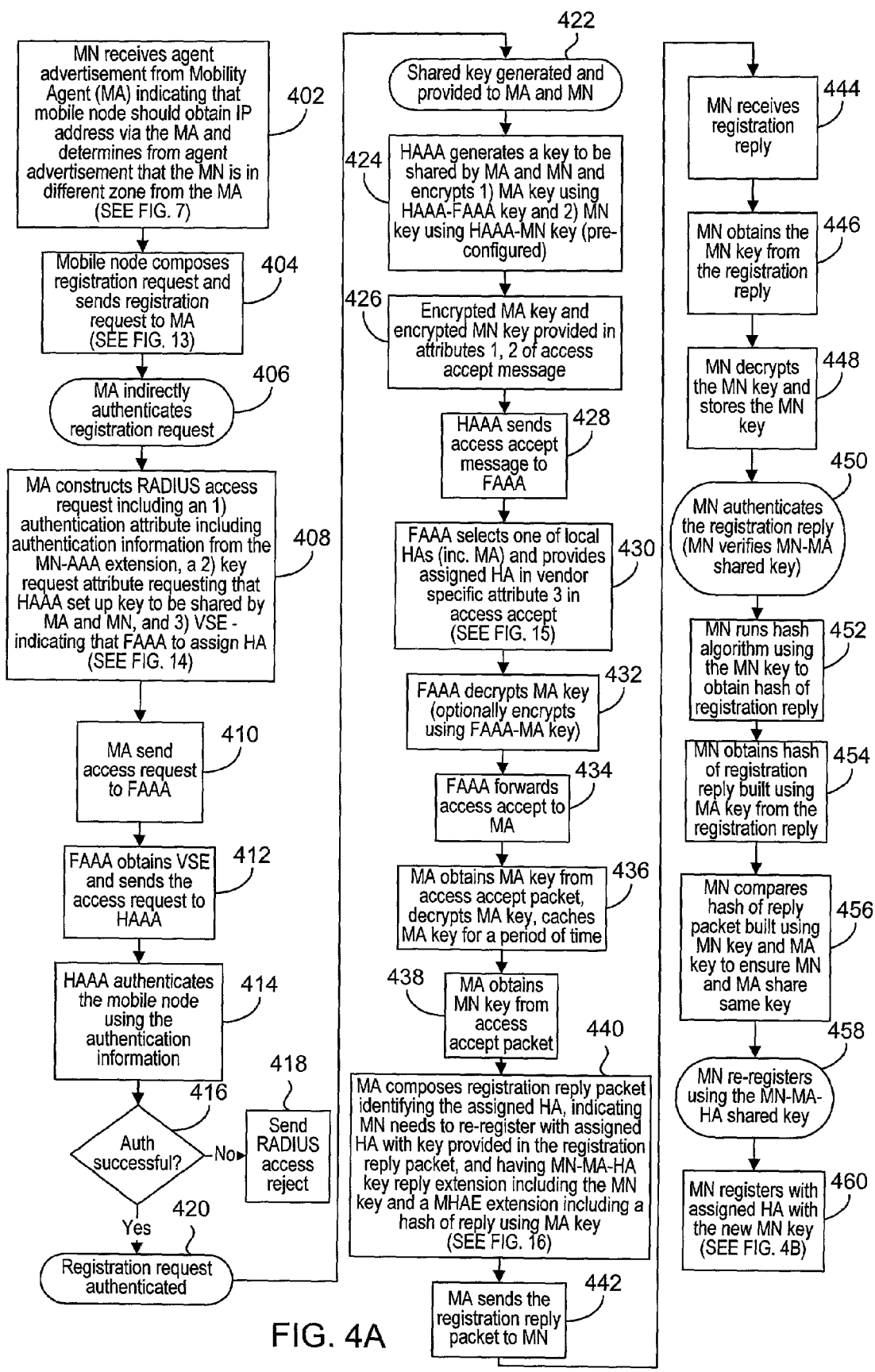
FIG. 4A is a process flow diagram illustrating a method of assigning a Home Agent to a mobile node in a different authentication domain from the Mobility Agent to which the mobile node has roamed, with load balancing, in accordance with another embodiment.

FIG. 4A is a process flow diagram illustrating a method of assigning a Home Agent to a mobile node in a different authentication domain from the Mobility Agent to which the mobile node has roamed, with load balancing, in accordance with another embodiment. In this embodiment, a local Home Agent is assigned to the mobile node. As shown at block 402, an agent advertisement is received by the Mobile Node from the Mobility Agent. As will be described in further detail below with reference to FIG. 7, the agent advertisement indicates that the Mobility Agent is providing mobility services. More particularly, the agent advertisement preferably advertises its services as both a Home Agent and a Foreign Agent. In addition, the agent advertisement indicates a zone (i.e., authentication domain) associated with the Mobility Agent. Moreover, the agent advertisement may also indicate that the mobile node should obtain an IP address via the Mobility Agent (e.g., from a Home Agent to be assigned to the mobile node).

In this example, the mobile node determines from the agent advertisement that the mobile node is in a different zone from the Mobility Agent. In addition, the agent advertisement indicates that the mobile node should obtain an IP address via the Mobility Agent as indicated above. Since load balancing may be performed, the Mobile Node cannot obtain an IP address via a DHCP server (located on the Mobility Agent subnet) since the local assigned Home Agent may be on a different subnet from the DHCP server. Since the Mobility Agent advertises its services as a Home Agent, the mobile node sends a registration request to the Mobility Agent as its Home Agent at block 404. The registration request also has an authentication extension for authenticating the mobile node. In addition, the registration request may indicate that a key to be shared by the mobile node and an agent with which it is registering (e.g., dynamically assigned Home Agent) is requested. An exemplary registration request will be described in further detail below with reference to FIG. 13.

When the Mobility Agent receives the registration request, it indirectly authenticates the registration request at blocks 406-420. This may be accomplished through sending an access request to the appropriate network device. In one embodiment, a RADIUS access request is sent to the appropriate AAA server. As shown at block 408, the Mobility Agent constructs a RADIUS access request having an authentication attribute that includes authentication information from the authentication extension of the registration request. In addition, the access request includes a key request attribute that indicates that a key to be shared by the mobile node and the agent with which it is registering (e.g., Mobility Agent or assigned Home Agent) is requested. In addition, the access request may include another attribute indicating that a Home Agent is to be assigned to the mobile node. For instance, a local Home Agent may be assigned by a local AAA server. An exemplary RADIUS access request packet will be described in further detail below with reference to FIG. 14. The Mobility Agent sends the access request to its local Foreign AAA server at block 410. The Foreign AAA server may then ascertain from the attribute of the access request that a Home Agent is to be assigned and then sends the access request to the Home AAA server at block 412. The Home AAA server then authenticates the mobile node using the authentication information at block 414. If it is determined that the authentication is not successful at block 416, the Home AAA server sends a RADIUS access reject message at block 418. Otherwise, if authentication is successful, the registration request and the mobile node have been authenticated as shown at block 420.

A shared key for use by the mobile node and the assigned Home Agent (e.g., Mobility Agent or local Home Agent) is then obtained. More particularly, in this instance, a shared key is generated and provided to the mobile node and the Mobility Agent 422, as shown and described with reference to blocks 424-442. In one embodiment, the key is generated by a Home AAA server at block 424. More particularly, the key that is to be shared by both the mobile node and the assigned Home Agent is provided as two keys to be separately transmitted (e.g., in two separate attributes of a single RADIUS message) to the mobile node and the assigned Home Agent. For instance, a first key (e.g., Mobility Agent key) is provided and preferably encrypted using a key shared by the Home AAA server and the Foreign AAA server. Similarly, a second key (e.g., mobile node key) is provided and preferably encrypted using a key shared by the Home AAA server and the mobile node. These two keys are then provided in separate attributes of an access accept message (e.g., RADIUS access accept message) as shown at block 426. Once the access accept packet is composed, the Home AAA server sends the access accept message to the Foreign AAA server at block 428. An exemplary RADIUS access accept message will be described in further detail below with reference to FIG. 15. The Foreign AAA server or another entity (e.g., Mobility Agent) selects one of a plurality of Home Agents (e.g., local Home Agents and Mobility Agent) and identifies the assigned Home Agent in an attribute in the access accept message at block 430. The Foreign AAA server may decrypt the Mobility Agent key and optionally encrypt the Mobility Agent key using a FAAA-MA key shared by the Foreign AAA server and the Mobility Agent at block 432. The Foreign AAA server then forwards the access accept message to the Mobility Agent at block 434.

The Mobility Agent obtains the shared key (e.g., Mobility Agent key) from the access accept packet at block 436, decrypts the Mobility Agent key, and stores the Mobility Agent key. However, since the Mobility Agent may not be the assigned Home Agent (e.g., in the case of a selected local Home Agent), the Mobility Agent may wish to only temporarily store the Mobility Agent key. For instance, the key may be stored in a cache for a specified period of time or, alternatively, until a subsequent registration reply is received from the assigned Home Agent. The Mobility Agent then obtains the second identical key (e.g., mobile node key) from the access accept packet at block 438 so that it may later send the mobile node key to the mobile node in a registration reply packet.

Figure 16:
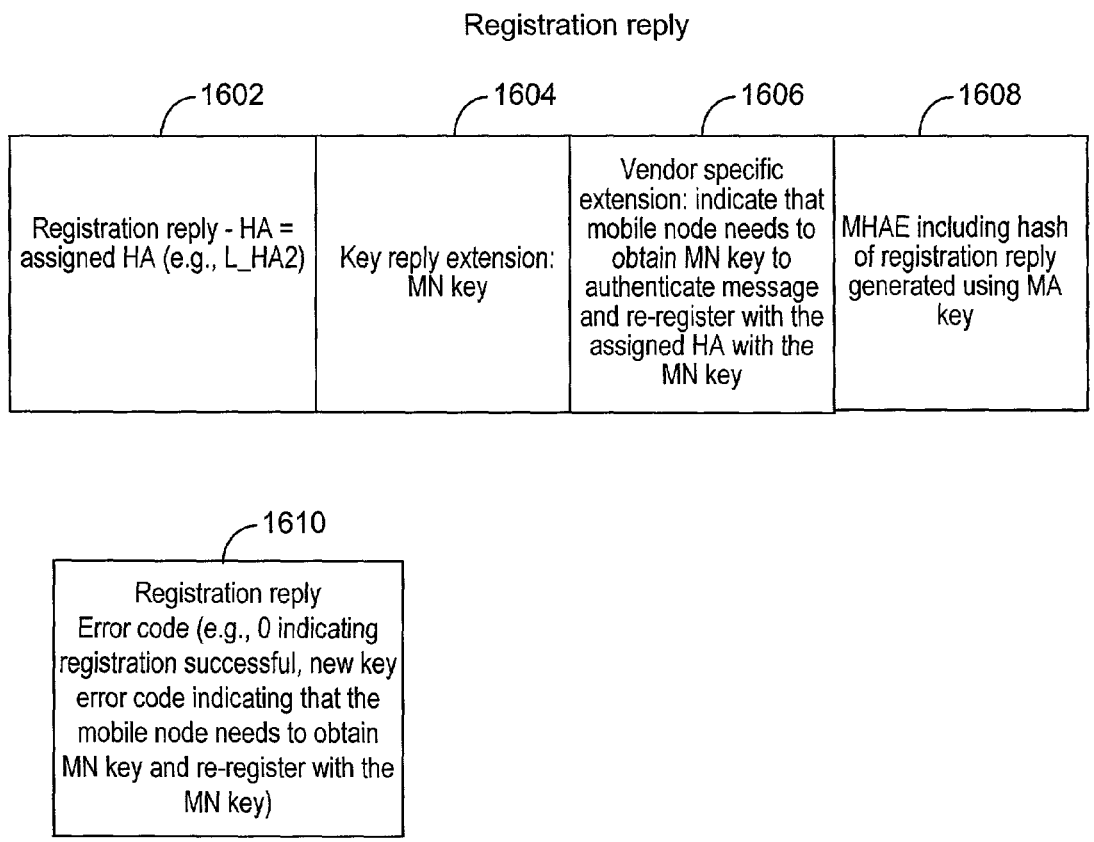
FIG. 16 is a diagram illustrating an exemplary registration reply that may be composed and sent by a Mobility Agent as shown at blocks 440-442 of FIG. 4A.

The Mobility Agent then composes a registration reply packet such as that illustrated in FIG. 16 at block 440. More particularly, the registration reply packet identifies the assigned Home Agent. In addition, the registration reply packet indicates that the mobile node needs to re-register with the assigned Home Agent (e.g., Mobility Agent) with the key provided in the registration reply packet. More particularly, in one embodiment, the registration reply packet includes a MN-HA key reply extension including the mobile node key and a Mobile-Home Authentication (MHAE) Extension including a hash of the registration reply using the Mobility Agent key. The Mobility Agent then sends the registration reply packet to the mobile node at block 442.

When the mobile node receives the registration reply at block 444, it obtains the shared key (e.g., MN key) from the registration reply packet at block 446, decrypts and stores the MN key at block 448. The mobile node then authenticates the registration reply using the obtained "shared" key. In other words, the mobile node verifies that it shares the same key with the Mobility Agent at blocks 450-456. More particularly, the mobile node runs a hash algorithm using the MN key at block 452 to obtain a hash of the registration reply packet. The mobile node also obtains a hash of the registration reply packet from the MHAE of the registration reply packet (built by the Mobility Agent using the MA key) at block 454. The mobile node then compares the hash of the registration reply packet built using MN key with that built using the MA key at block 456 to ensure that the mobile node and the Mobility Agent share the same key.

Figure 4B:
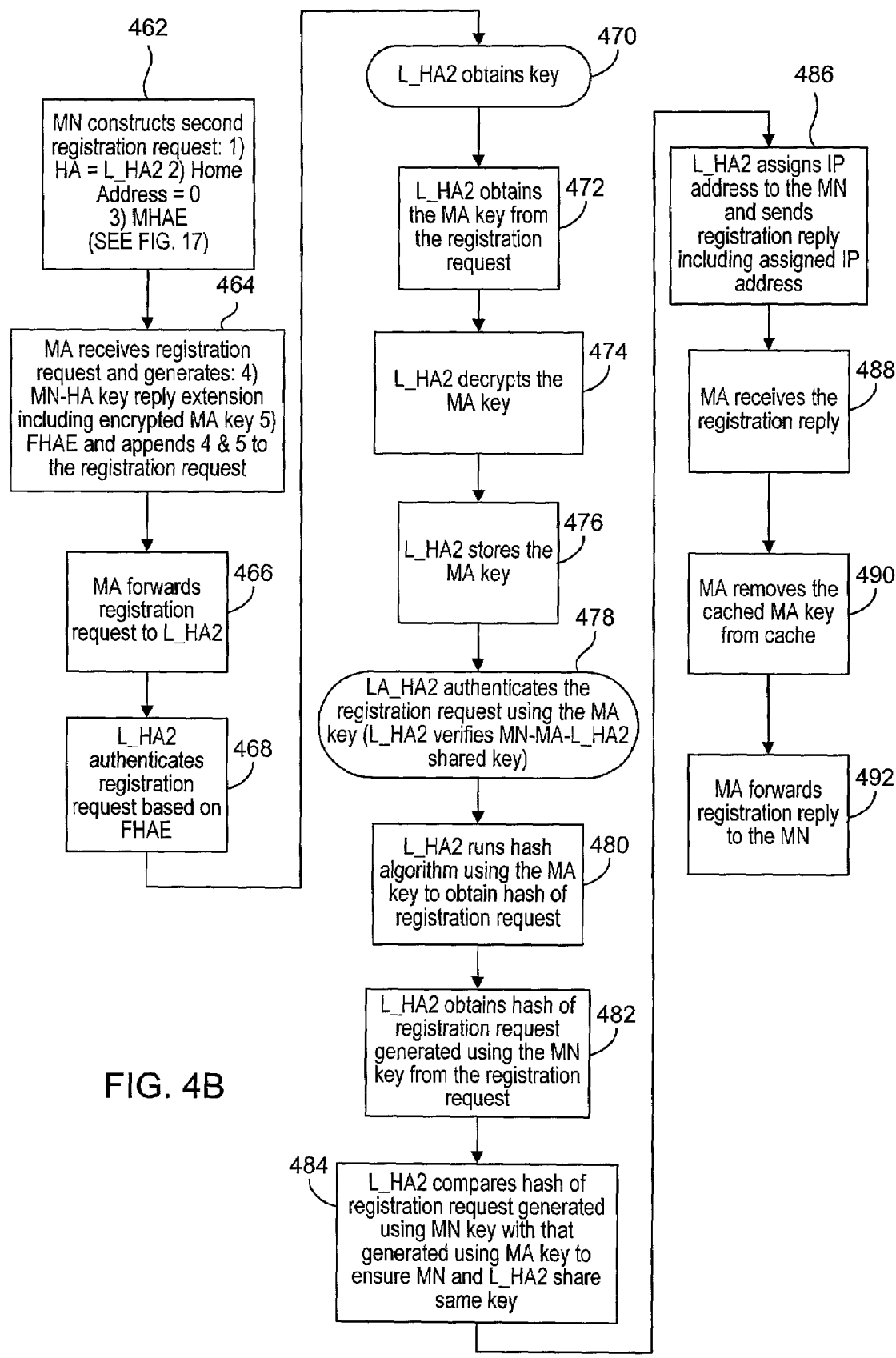
FIG. 4B is a process flow diagram illustrating a method of registering with a dynamically assigned Home Agent as shown at block 460 of FIG. 4A.

Once authentication is completed, the mobile node preferably re-registers with the assigned Home Agent (e.g., local Home Agent) with the newly received MN key as shown at blocks 458-460. FIG. 4B is a process flow diagram illustrating a method of registering with a dynamically assigned Home Agent as shown at block 460 of FIG. 4A. The mobile node constructs and sends a second registration request packet at block 462. An exemplary registration request packet that may be sent will be further described below with reference to FIG. 17. More particularly, the second registration request packet is addressed to the assigned Home Agent (e.g., local Home Agent L_HA2). In addition, the mobile node may indicate that it is requesting the assignment of an IP address with Home Address field equal to 0. The Mobility Agent receives the registration request at block 464 and generates a key reply extension including the MA key (preferably encrypted) and a Foreign-Home Authentication Extension (FHAE). The Mobility Agent then forwards the registration request to the assigned Home Agent (e.g., L_HA2) at block 466.

When the assigned Home Agent receives the registration request, it then authenticates the request based on the FHAE at block 468 and then completes authentication using the "shared key" (e.g., MA key) as shown at blocks 470-484. More particularly, as shown at block 472, the assigned Home Agent obtains the MA key from the registration request, decrypts the MA key 474, and stores the MA key at block 476. The assigned Home Agent then completes authentication using the MA key through verifying that both the mobile node and the assigned Home Agent share the "same" key as shown at blocks 478-484. As shown, the assigned Home Agent (e.g., L_HA2) runs a hash algorithm using the MA key to obtain a hash of the registration request at block 480. The assigned Home Agent also obtains a hash of the registration request message, created by the Mobile Node using the MN key, from the registration request at block 482. The assigned Home Agent then compares the hash of the registration request composed using MN key with that generated using the MA key to ensure that the assigned Home Agent and the mobile node share the same key at block 484.

Once authentication is completed, the assigned Home Agent may assign an IP address to the mobile node at block 486 and sends the registration reply including the assigned IP address to the mobile node. When the Mobility Agent receives the registration reply at block 488, it may remove the MA key from memory at block 490. The registration reply is then forwarded to the mobile node at block 492.

The shared keys preferably are allotted a lifetime. This important when the Mobile Node is in a different authentication domain from the Mobility Agent, as well as when the Mobile Node is in the same authentication domain as the Mobility Agent.

Figure 5:
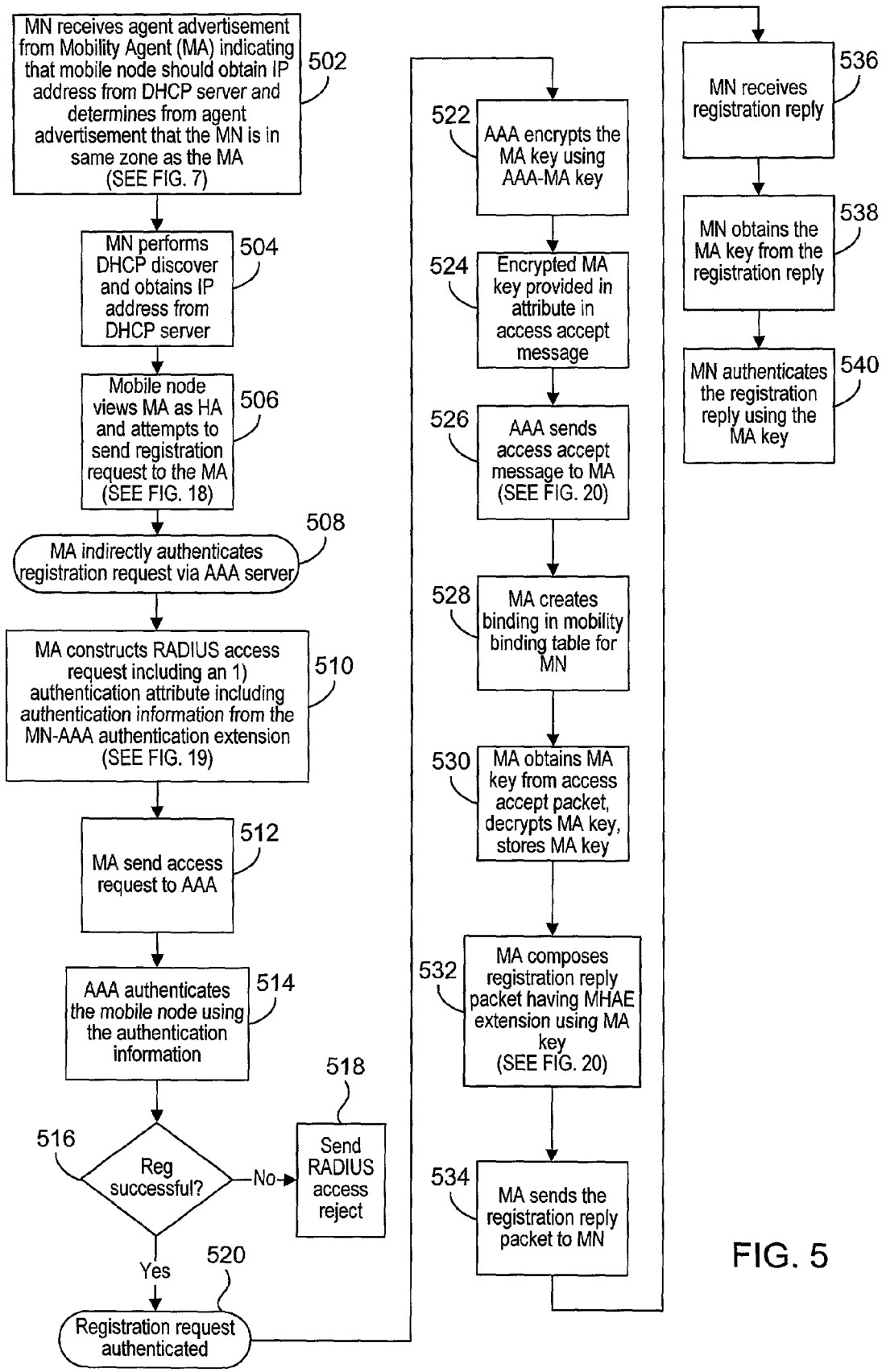
FIG. 5 is a process flow diagram illustrating a method of assigning a Home Agent to a mobile node in the same authentication domain as the Mobility Agent to which the mobile node has roamed in accordance with another embodiment.

FIG. 5 is a process flow diagram illustrating a method of assigning a Home Agent to a mobile node in the same authentication domain as the Mobility Agent to which the mobile node has roamed in accordance with another embodiment. In this embodiment, the "assigned" Home Agent is the Mobility Agent. As shown at block 502, an agent advertisement is received by the Mobile Node from the Mobility Agent. As will be described in further detail below with reference to FIG. 7, the agent advertisement indicates that the Mobility Agent is providing mobility services. More particularly, the agent advertisement preferably advertises its services as both a Home Agent and a Foreign Agent. In addition, the agent advertisement indicates a zone (i.e., authentication domain) associated with the Mobility Agent. Moreover, the agent advertisement may also indicate that the mobile node should obtain an IP address from a DHCP server.

In this example, the mobile node determines from the agent advertisement that the mobile node is in the same zone as the Mobility Agent. In addition, the agent advertisement indicates that the mobile node should obtain an IP address from the DHCP server, as described above. Thus, the mobile node performs a DHCP discover and obtains an IP address from a DHCP server at block 504. Since the Mobility Agent advertises its services as a Home Agent, the mobile node sends a registration request to the Mobility Agent as its Home Agent at block 506. The registration request also has an authentication extension for authenticating the mobile node. An exemplary registration request will be described in further detail below with reference to FIG. 18.

When the Mobility Agent receives the registration request, it indirectly authenticates the registration request at blocks 508-520. This may be accomplished through sending an access request to the appropriate network device. In one embodiment, a RADIUS access request is sent to the appropriate AAA server. As shown at block 510, the Mobility Agent constructs a RADIUS access request having an authentication attribute that includes authentication information from the authentication extension of the registration request. An exemplary RADIUS access request packet will be described in further detail below with reference to FIG. 19. The Mobility Agent sends the access request to a AAA server at block 512. The AAA server then authenticates the mobile node using the authentication information at block 514. If it is determined that the authentication is not successful at block 516, the Home AAA server sends a RADIUS access reject message at block 518. Otherwise, if authentication is successful, the registration request and the mobile node have been authenticated as shown at block 520.

The key shared by the mobile node and the Mobility Agent is then obtained. More particularly, in this instance, the shared key is provided to the mobile node (e.g., for authentication) and the Mobility Agent, as shown and described with reference to blocks 522-534. In one embodiment, the key is obtained from a AAA server at block. More particularly, the key (e.g., MA key) that is shared by both the mobile node and the Mobility Agent is preferably encrypted using a key shared by the AAA server and the Mobility Agent. This key is then provided in an attribute of an access accept message (e.g., RADIUS access accept message) as shown at block 524. Once the access accept packet is composed, the AAA server sends the access accept message to the Mobility Agent at block 526. An exemplary RADIUS access accept message will be described in further detail below with reference to FIG. 20. The Mobility Agent creates a binding for the mobile node in a mobility binding table at block 528. The Mobility Agent then obtains the shared key (e.g., Mobility Agent key) from the access accept packet at block 530, decrypts the Mobility Agent key, and stores the Mobility Agent key.

The Mobility Agent then composes a registration reply packet at block 532. More particularly, in one embodiment, the registration reply packet includes a standard Mobile-Home Authentication (MHAE) Extension including the Mobility Agent key, which is encrypted. The Mobility Agent then sends the registration reply packet to the mobile node at block 534.

When the mobile node receives the registration reply at block 536, it obtains the shared key (e.g., MA key) from the registration reply packet at block 538, decrypts the key as appropriate and stores the MA key. The mobile node then authenticates the registration reply using the obtained "shared" key (e.g., MN key) at block 540.

Figure 6A:
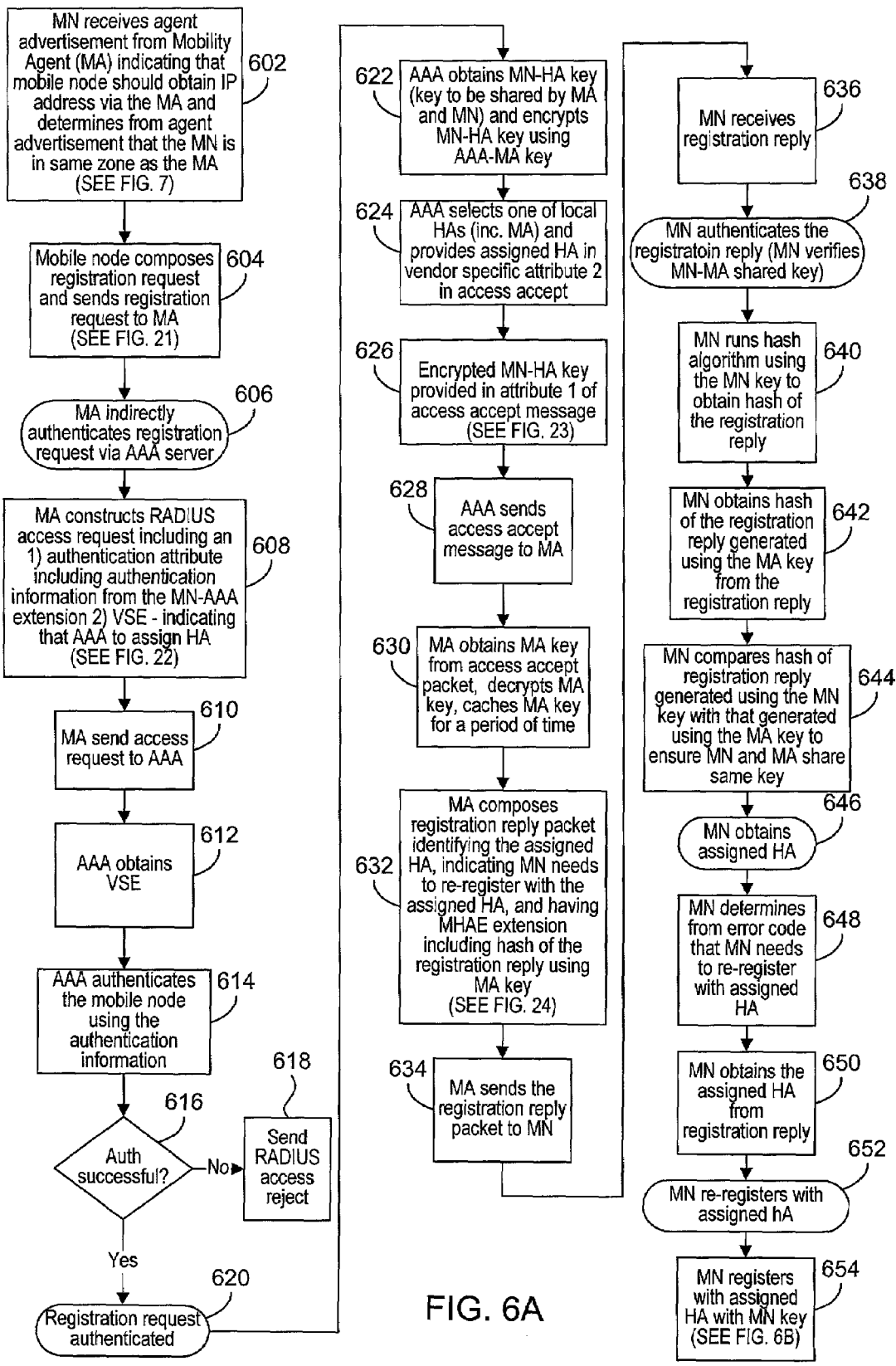
FIG. 6A is a process flow diagram illustrating a method of assigning a Home Agent to a mobile node in the same authentication domain as the Mobility Agent to which the mobile node has roamed, with load balancing, in accordance with another embodiment.

FIG. 6A is a process flow diagram illustrating a method of assigning a Home Agent to a mobile node in the same authentication domain as the Mobility Agent to which the mobile node has roamed, with load balancing, in accordance with another embodiment. In this embodiment, a Home Agent (e.g., local Home Agent) is assigned to the mobile node. As shown at block 602, an agent advertisement is received by the Mobile Node from the Mobility Agent. As will be described in further detail below with reference to FIG. 7, the agent advertisement indicates that the Mobility Agent is providing mobility services. More particularly, the agent advertisement preferably advertises its services as both a Home Agent and a Foreign Agent. In addition, the agent advertisement indicates a zone (i.e., authentication domain) associated with the Mobility Agent. Moreover, the agent advertisement may also indicate that the mobile node should obtain an IP address via the Mobility Agent (e.g., from a Home Agent to be assigned to the mobile node).

In this example, the mobile node determines from the agent advertisement that the mobile node is in the same zone as the Mobility Agent. In addition, the agent advertisement indicates that the mobile node should obtain an IP address via the Mobility Agent as indicated above. Since the Mobility Agent advertises its services as a Home Agent, the mobile node sends a registration request to the Mobility Agent as its Home Agent at block 604. The registration request also has an authentication extension for authenticating the mobile node. An exemplary registration request will be described in further detail below with reference to FIG. 21.

When the Mobility Agent receives the registration request, it indirectly authenticates the registration request via the AAA server at blocks 606-620. This may be accomplished through sending an access request to the appropriate network device. In one embodiment, a RADIUS access request is sent to the appropriate AAA server. As shown at block 608, the Mobility Agent constructs a RADIUS access request having an authentication attribute that includes authentication information from the authentication extension of the registration request. In addition, the access request may include another attribute indicating that a Home Agent is to be assigned to the mobile node. For instance, a local Home Agent may be assigned by a local AAA server. An exemplary RADIUS access request packet will be described in further detail below with reference to FIG. 22. The Mobility Agent sends the access request to an AAA server at block 610. The AAA server may then ascertain from the attribute of the access request that a Home Agent is to be assigned at block 612. The AAA server then authenticates the mobile node using the authentication information at block 614. If it is determined that the authentication is not successful at block 616, the AAA server sends a RADIUS access reject message at block 618. Otherwise, if authentication is successful, the registration request and the mobile node have been authenticated as shown at block 620.

A shared key for use by the mobile node and the assigned Home Agent (e.g., Mobility Agent or local Home Agent) is then obtained. More particularly, in this instance, the key that is shared by the mobile node and the Mobility Agent is obtained and provided to the mobile node (e.g., for authentication) and the Mobility Agent (e.g., for transmission to the assigned Home Agent), as shown and described with reference to blocks 622-634. In one embodiment, the key is obtained from a AAA server at block 622. More particularly, the key that is to be shared by both the mobile node and the assigned Home Agent is provided, thereby enabling the key to be separately transmitted to the mobile node and the assigned Home Agent. For instance, a key (e.g., Mobility Agent key) that is shared by the mobile node and its Home Agent may be obtained and preferably encrypted using a key shared by the AAA server and the Mobility Agent. A Home Agent is then assigned to the mobile node at block 624. More particularly, the AAA server or another entity (e.g., Mobility Agent) selects one of a plurality of Home Agents (e.g., local Home Agents and Mobility Agent) and identifies the assigned Home Agent in a first attribute of the access accept message. The key is then provided in a second attribute of the access accept message (e.g., RADIUS access accept message) as shown at block 626. Once the access accept packet is composed, the AAA server sends the access accept message to the Mobility Agent at block 628. An exemplary RADIUS access accept message will be described in further detail below with reference to FIG. 23.

The Mobility Agent obtains the shared key (e.g., Mobility Agent key) from the access accept packet at block 630, decrypts the Mobility Agent key, and stores the Mobility Agent key. However, since the Mobility Agent may not be the assigned Home Agent (e.g., in the case of a selected local Home Agent), the Mobility Agent may wish to only temporarily store the Mobility Agent key. For instance, the key may be stored in a cache for a specified period of time or, alternatively, until a subsequent registration reply is received from the assigned Home Agent.

Figure 24:
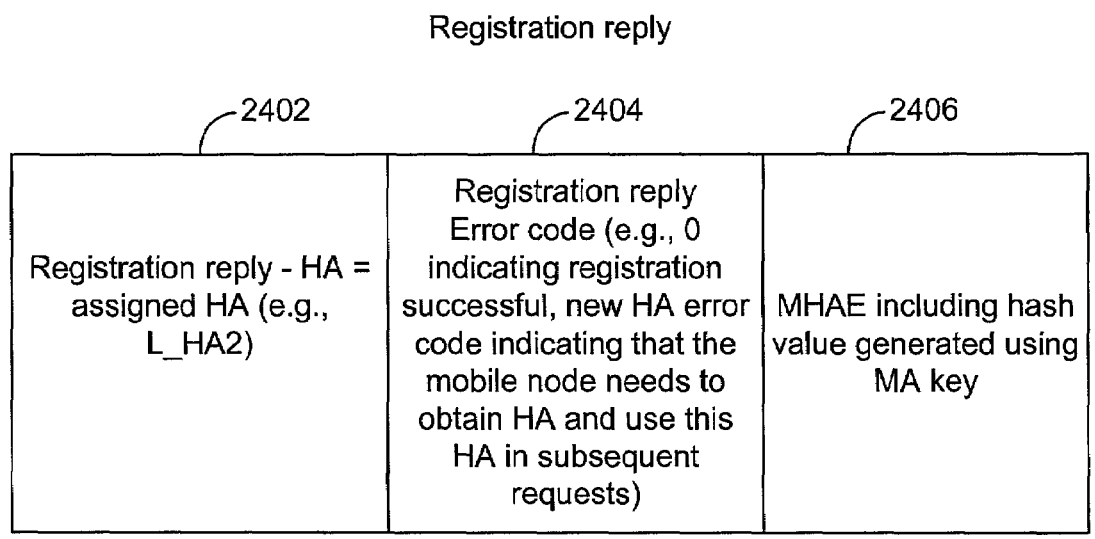
FIG. 24 is a diagram illustrating an exemplary registration reply that may be composed and sent by a Mobility Agent as shown at block 632 of FIG. 6A.

The Mobility Agent then composes a registration reply packet such as that illustrated in FIG. 24 at block 632. More particularly, the registration reply packet identifies the assigned Home Agent. In addition, the registration reply packet indicates that the mobile node needs to re-register with the assigned Home Agent (e.g., Mobility Agent). The Mobility Agent then sends the registration reply packet to the mobile node at block 634.

When the mobile node receives the registration reply at block 636, the mobile node authenticates the registration reply using the "shared" key. In other words, the mobile node verifies that it shares the same key with the Mobility Agent at blocks 638-644. More particularly, the mobile node runs a hash algorithm using the MN key maintained by the mobile node at block 640 to obtain a hash of the registration reply. The mobile node also obtains a hash of the registration reply generated via the MA key from the registration reply packet at block 642. The mobile node then compares the hash of the registration reply packet generated using the MN key with the hash of the registration reply packet generated using the MA key at block 644 to ensure that the mobile node and the Mobility Agent share the same key.

Once the mobile node has authenticated the registration reply packet, the mobile node obtains the assigned Home Agent and re-registers with the assigned Home Agent. More particularly, the mobile node obtains the assigned Home Agent 646 at blocks 648-650. As shown, the mobile node determines (e.g., from an extension to the registration reply or error code) that the mobile node needs to re-register, this time with the assigned Home Agent at block 648. The mobile node then obtains the assigned Home Agent identifier from the registration reply at block 650. The mobile node then registers with the assigned Home Agent 652. More particularly, the mobile node registers with the assigned Home Agent (e.g., local Home Agent) with the mobile node key that is shared with the Mobility Agent block 654. One method of re-registering with the assigned Home Agent will be described as follows with reference to FIG. 6B.

Figure 6B:
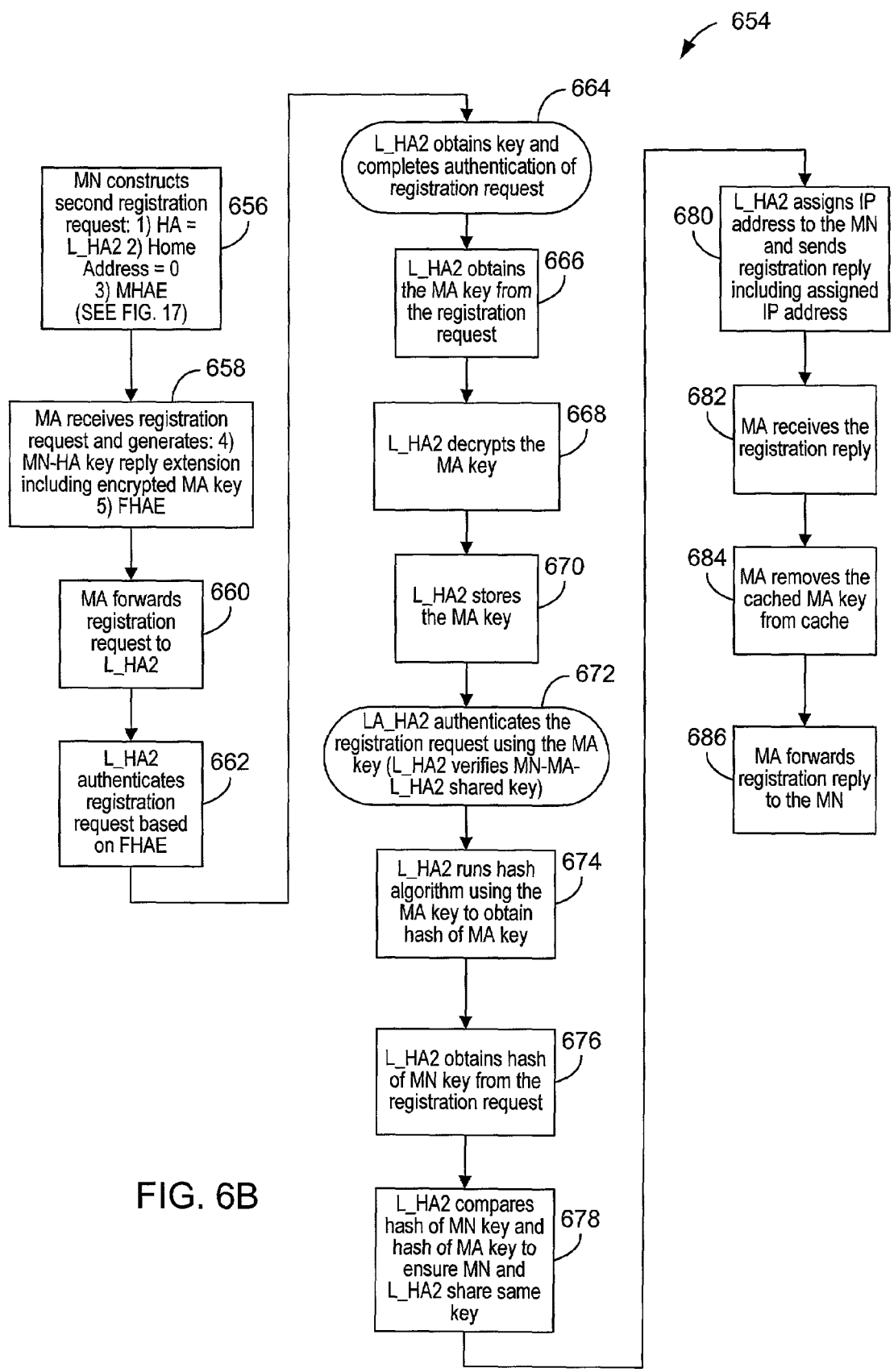
FIG. 6B is a process flow diagram illustrating a method of registering with a dynamically assigned Home Agent as shown at block 654 of FIG. 6A.

Once authentication is completed, the mobile node preferably re-registers with the assigned Home Agent (e.g., local Home Agent) with the previously configured MN key. FIG. 6B is a process flow diagram illustrating a method of registering with a dynamically assigned Home Agent as shown at block 654 of FIG. 6A. The mobile node constructs and sends a second registration request packet at block 656. An exemplary registration request packet that may be sent will be further described below with reference to FIG. 17. More particularly, the second registration request packet is addressed to the assigned Home Agent (e.g., local Home Agent L_HA2). In addition, the mobile node may indicate that it is requesting the assignment of an IP address with Home Address field equal to 0. The Mobility Agent receives the registration request at block 658 and generates a key reply extension including the MA key (preferably encrypted) and a Foreign-Home Authentication Extension (FHAE). The Mobility Agent then forwards the registration request to the assigned Home Agent (e.g., L_HA2) at block 660.

When the assigned Home Agent receives the registration request, it then authenticates the request based on the FHAE at block 662 and then completes authentication using the "shared key" (e.g., MA key) as shown at blocks 664-678. More particularly, as shown at block 666, the assigned Home Agent obtains the MA key from the registration request, decrypts the MA key 668, and stores the MA key at block 670. The assigned Home Agent then completes authentication using the MA key through verifying that both the mobile node and the assigned Home Agent share the "same" key as shown at blocks 672-678. As shown, the assigned Home Agent (e.g., L_HA2) runs a hash algorithm using the MA key to obtain a hash value of the MA key at block 674. The assigned Home Agent also obtains a hash of the MN key from the registration request at block 676. The assigned Home Agent then compares the hash of the MN key and the hash of the MA key to ensure that the assigned Home Agent and the mobile node share the same key at block 678.

Once authentication is completed, the assigned Home Agent may assign an IP address to the mobile node at block 680 and sends the registration reply including the assigned IP address to the mobile node. When the Mobility Agent receives the registration reply at block 682, it may remove the MA key from memory at block 684. The registration reply is then forwarded to the mobile node at block 686.

Figure 7:
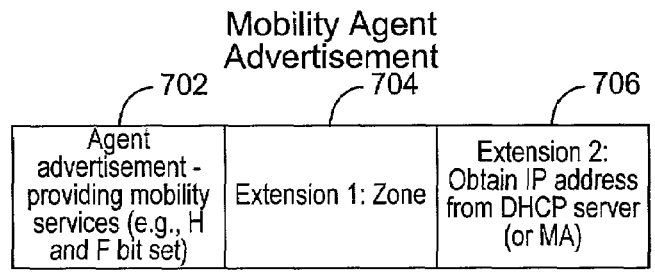
FIG. 7 is a diagram illustrating an exemplary agent advertisement that may be sent by a Mobility Agent in accordance with various embodiments of the invention.

FIG. 7 is a diagram illustrating an exemplary agent advertisement that may be sent by a Mobility Agent in accordance with various embodiments of the invention. As shown, the mobility agent advertisement indicates that the agent provides mobility services as both a Home Agent and a Foreign Agent, since both H and F bits of the agent advertisement are set 702. In addition, a zone or authentication domain 704 is indicated in a first extension to the agent advertisement. In addition, a second extension 706 indicates that the mobile node is to obtain an IP address from a DHCP server (or Mobility Agent).

Figure 8:
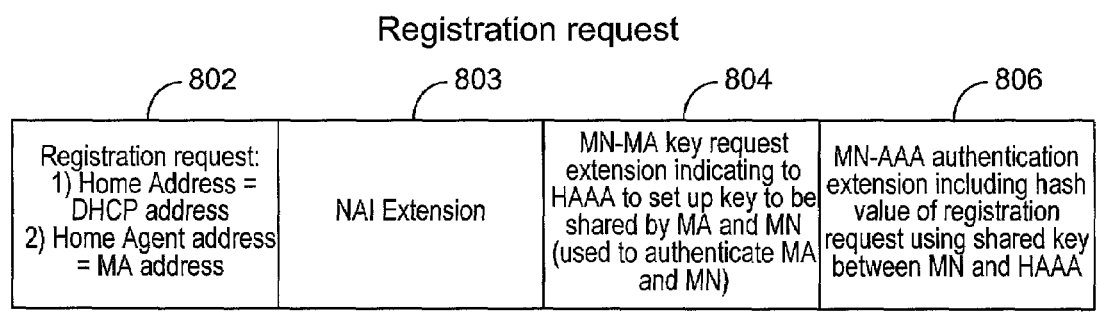
FIG. 8 is a diagram illustrating an exemplary registration request that may be sent by a mobile node as shown at block 306 of FIG. 3.

As described above, FIG. 3 illustrates a method of registering a mobile node with a Mobility Agent when they are in different authentication domains. FIG. 8 is a diagram illustrating an exemplary registration request that may be sent by a mobile node as shown at block 306 of FIG. 3. The registration request packet 802 includes a Home Address field having an obtained DHCP address and a Home Agent address equal to the Mobility Agent address. The registration request further includes a Network Access Identifier (NAI) extension 803 that includes a Mobile Node identifier, which will be described in further detail below. A MN-MA key request extension 804 indicates to the Home AAA server to set up a key to be shared by the Mobility Agent and the mobile node. One mechanism for implementing such a key request extension is described in a draft submitted to the Mobile IP Working Group entitled "Generalized Key Distribution Extensions for Mobile IP," Perkins et al, Aug. 27, 2001, which is incorporated by reference herein for all purposes. In addition, a MN-AAA authentication extension 806 includes a hash value of the registration request using a key that is shared by the mobile node and the Home AAA server.

Figure 9:
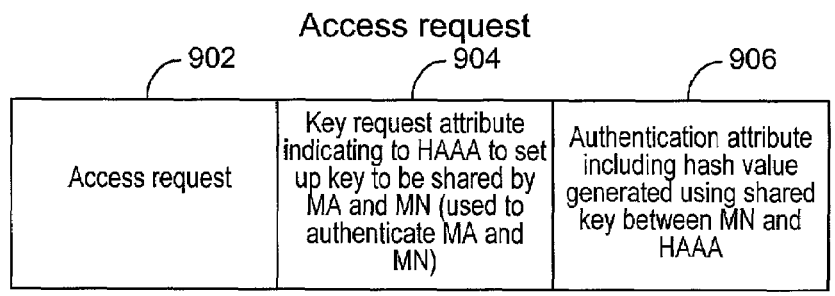
FIG. 9 is a diagram illustrating an exemplary access request that may be sent to a AAA server as shown at block 310 of FIG. 3.

FIG. 9 is a diagram illustrating an exemplary access request that may be sent to a AAA server as shown at block 310 of FIG. 3. As shown, the access request 902 includes a key request attribute 904 indicating to the Home AAA server to set up a key to be shared by the Mobility Agent and the mobile node. In addition, an authentication attribute 906 includes a hash value generated using the key shared by the mobile node and the Home AAA server.

Figure 10:
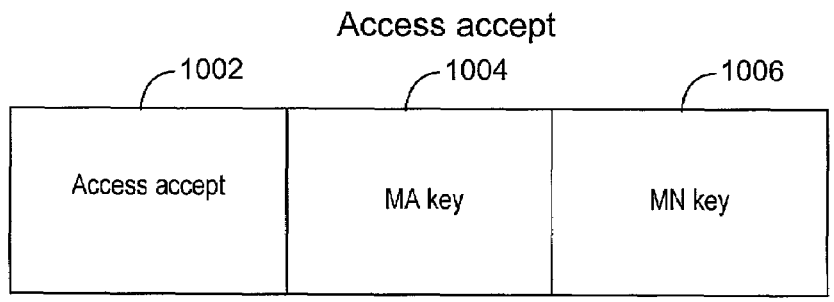
FIG. 10 is a diagram illustrating an exemplary access accept that may be constructed and sent by a AAA server as shown at blocks 328-330 of FIG. 3.

FIG. 10 is a diagram illustrating an exemplary access accept that may be constructed and sent by a AAA server as shown at blocks 328-330 of FIG. 3. As shown, an access accept message 1002 may include a first attribute 1004 including a MA key to be transmitted to the Mobility Agent and a second attribute 1006 including a MN key 1006 to be transmitted to the mobile node.

FIG. 11A is a diagram illustrating an exemplary registration reply that may be sent by a Mobility Agent as shown at block 342 of FIG. 3. As shown, the registration reply packet 1102 has a vendor specific extension 1104 indicating that the mobile node needs to obtain the mobile node (MN) key and re-register with the mobile node key. In addition, a key reply extension 1106 includes the MN key while a MHAE 1108 includes a hash of the registration reply using the Mobility Agent (MA) key.

FIG. 11B is a diagram illustrating another exemplary registration reply that may be sent by a Mobility Agent as shown at block 342 of FIG. 3. In addition to or instead of a vendor specific extension such as the vendor specific extension 1104 of FIG. 11A, an error code 1110 may be used to indicate that the mobile node needs to obtain the MN key and re-register using the MN key.

Figure 12:
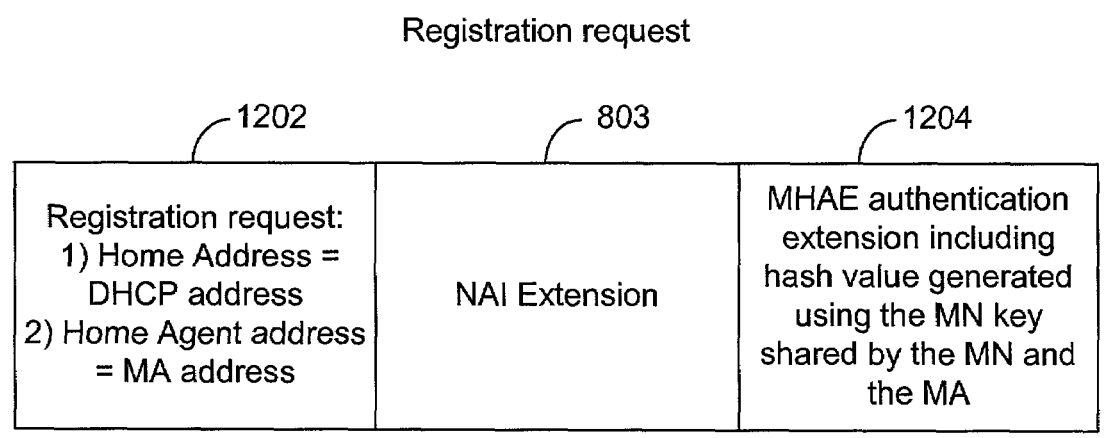
FIG. 12 is a diagram illustrating an exemplary registration request that may sent by a mobile node to a Mobility Agent upon re-registration of the mobile node with the Mobility Agent as shown at block 362 of FIG. 3.

FIG. 12 is a diagram illustrating an exemplary registration request that may sent by a mobile node to a Mobility Agent upon re-registration of the mobile node with the Mobility Agent as shown at block 362 of FIG. 3. As shown, the second registration request 1202 includes a Home Address field including the DHCP address and a Home Agent address equal to the Mobility Agent IP address. The registration request further includes an NAI extension 803 that includes a Mobile Node identifier. In addition, the MHAE authentication extension 1204 includes a hash value generated using the MN key that is now shared by the mobile node and the Mobilty Agent.

Figure 13:
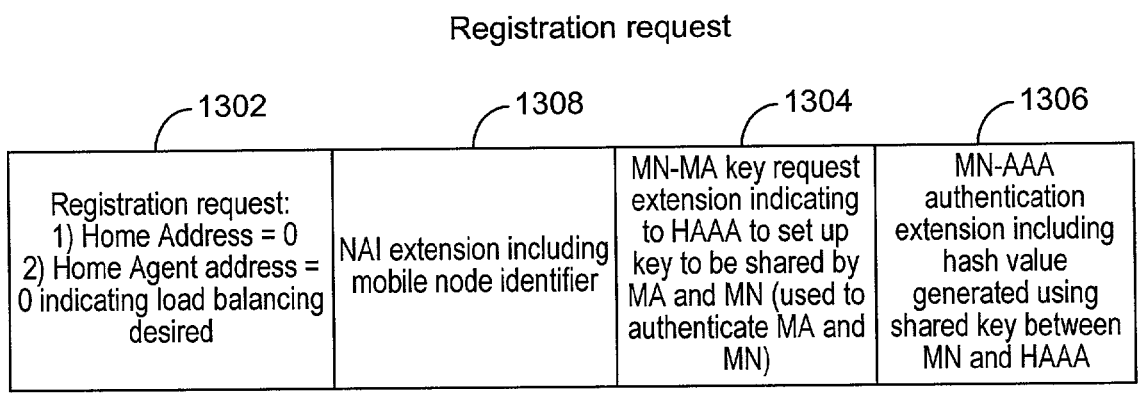
FIG. 13 is a diagram illustrating an exemplary registration request that may be sent by a mobile node as shown at block 404 of FIG. 4A.

As described above with reference to FIG. 4A and FIG. 4B, even when the Mobility Agent and the mobile node are in a different zone, the mobile node may register with an assigned Home Agent via the Mobility Agent. FIG. 13 is a diagram illustrating an exemplary registration request that may be sent by a mobile node as shown at block 404 of FIG. 4A. The registration request 1302 includes a Home Address field equal to zero, indicating that an IP address is requested. In addition, the Home Agent address field is equal to zero, indicating that load balancing is desired through the assignment of a Home Agent. A MN-MA key request extension 1304 indicates to a Home AAA server to set up a key to be shared by the Mobility Agent and the mobile node. In addition, a MN-AAA authentication extension 1306 includes a hash value generated using the key shared between the mobile node and the Home AAA server.

One standardized method for identifying users is proposed in RFC 2486 of the Network Working Group, January 1999, hereby incorporated by reference, which proposes syntax for the Network Access Identifier (NAI), the userid submitted by a client during Point to Point Protocol (PPP) authentication. Thus, when a client is authenticated based upon the NAI, an IP address may be allocated for use by the client. Thus, as shown, in one embodiment, a Network Access Identifier (NAI) extension 1308 is used to identify the mobile node via a mobile node identifier (e.g., serial number) until an IP address is assigned to the mobile node.

Figure 14:
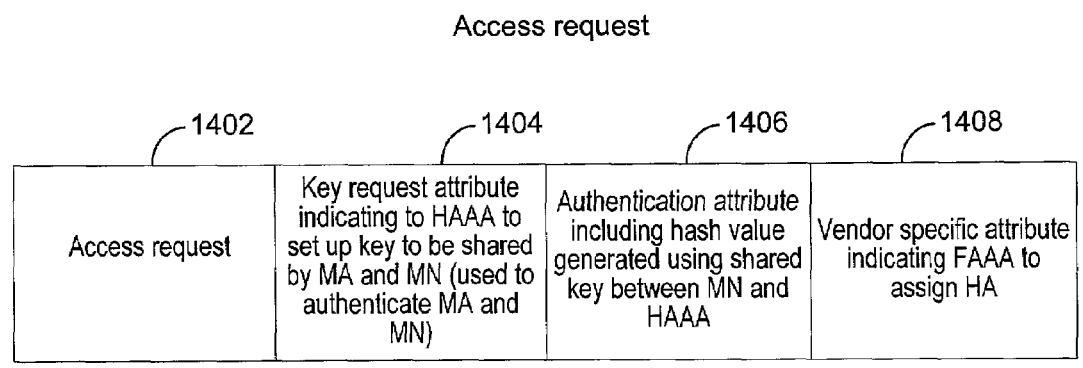
FIG. 14 is a diagram illustrating an exemplary access request that may be sent by a Mobility Agent to a AAA server as shown at blocks 408-410 of FIG. 4A.

FIG. 14 is a diagram illustrating an exemplary access request that may be sent by a Mobility Agent to a AAA server as shown at blocks 408-410 of FIG. 4A. The access request 1402 includes a key request attribute 1404 indicating to the Home AAA server to set up a key to be shared by the Mobility Agent and the mobile node. An authentication attribute 1406 includes a hash value generated using a key that is shared between the mobile node and the Home AAA server. A vendor specific attribute 1408 indicates that a Home Agent is to be assigned to the mobile node (e.g., by the Foreign AAA server).

Figure 15:
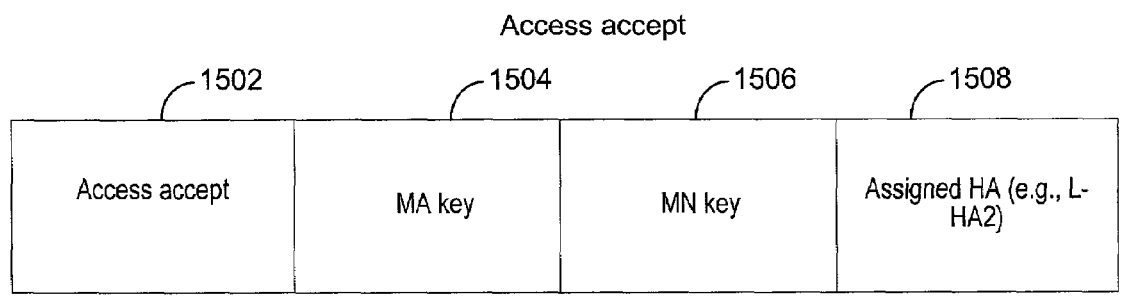
FIG. 15 is a diagram illustrating an exemplary access accept that may be constructed and sent by a AAA server as shown at blocks 426-430 of FIG. 4A.

FIG. 15 is a diagram illustrating an exemplary access accept that may be constructed and sent by a AAA server as shown at blocks 426-430 of FIG. 4A. The access accept packet 1502 includes several attributes. A first attribute 1504 includes the MA key 1504, a second attribute 1506 includes the MN key, and a third attribute 1508 identifies the assigned Home Agent (e.g., L_HA2).

FIG. 16 is a diagram illustrating an exemplary registration reply that may be composed and sent by a Mobility Agent as shown at blocks 440-442 of FIG. 4A. Registration reply 1602 includes Home Agent field equal to the IP address of the assigned Home Agent. Key reply extension 1604 includes MN key. In addition, vendor specific extension 1606 indicates that the mobile node needs to obtain the MN key (e.g., from the key reply extension 1604) to authenticate the message and re-register with the assigned Home Agent using the MN key. MHAE 1608 includes a hash value of the registration reply generated using the MA key to enable the registration reply packet to be authenticated. In addition, or instead of, the vendor specific extension 1606, the registration reply 1610 may include an error code indicating that the mobile node needs to obtain the MN key and re-register using the MN key.

Figure 17:
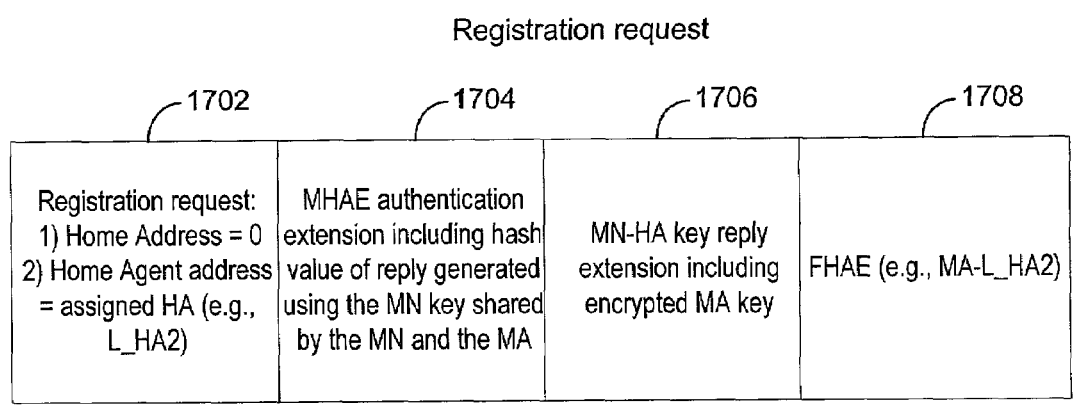
FIG. 17 is a diagram illustrating an exemplary registration request that may be subsequently sent by a mobile node as shown at block 462 of FIG. 4B and block 656 of FIG. 6B.

FIG. 17 is a diagram illustrating an exemplary registration request that may be subsequently sent by a mobile node as shown at block 462 of FIG. 4B and block 656 of FIG. 6B. Registration request 1702 includes Home Address field equal to zero, indicating that an IP address is to be assigned to the Home Agent. In addition, Home Agent address is equal to the assigned Home Agent (e.g., LHA2). MHAE authentication extension 1704 includes a hash value of the registration reply generated using the MN key shared by the mobile node and the Mobility Agent. MN-HA key reply extension 1706 includes MA key, preferably encrypted. Foreign-Home Authentication Extension (FHAE) 1708 identifies the assigned Home Agent (e.g., L_HA2).

Figure 18:
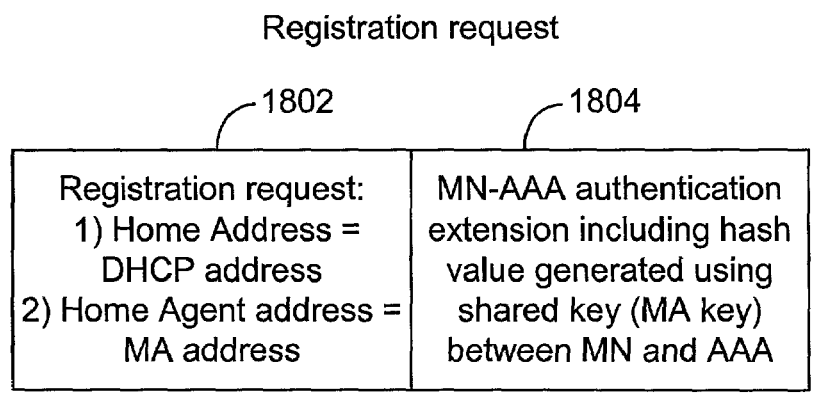
FIG. 18 is a diagram illustrating an exemplary registration request that may be sent by a mobile node as shown at block 506 of FIG. 5.

As described above, FIG. 5 illustrates a method of registering a mobile node with a Mobility Agent when they are in the same authentication domain. FIG. 18 is a diagram illustrating an exemplary registration request that may be sent by a mobile node as shown at block 506 of FIG. 5. Registration request 1802 includes Home Address field including the DHCP address and Home Agent address equal to the Mobility Agent address. MN-AAA authentication extension 1804 includes a hash value generated using the shared key (e.g., MA key) that is shared between the mobile node and the AAA server.

Figure 19:
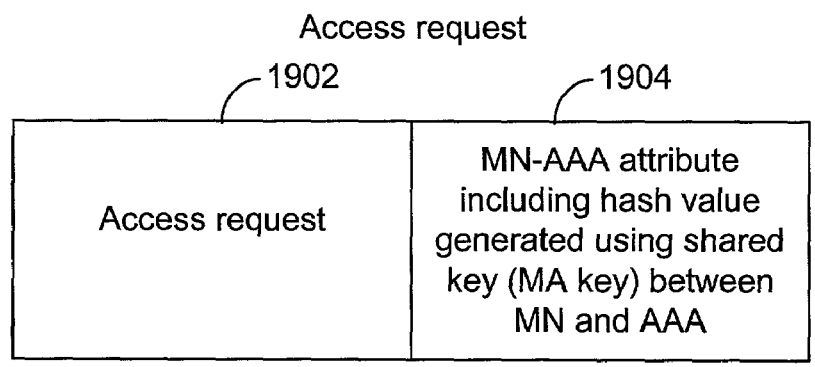
FIG. 19 is a diagram illustrating an exemplary access request that may be constructed and sent by a Mobility Agent to a AAA server as shown at blocks 510-512 of FIG. 5.

FIG. 19 is a diagram illustrating an exemplary access request that may be constructed and sent by a Mobility Agent to a AAA server as shown at blocks 510-512 of FIG. 5. Access request 1902 includes a MN-AAA attribute 1904 including a hash value generated using the shared key (e.g., MA key) between the mobile node and the AAA server.

Figure 20:
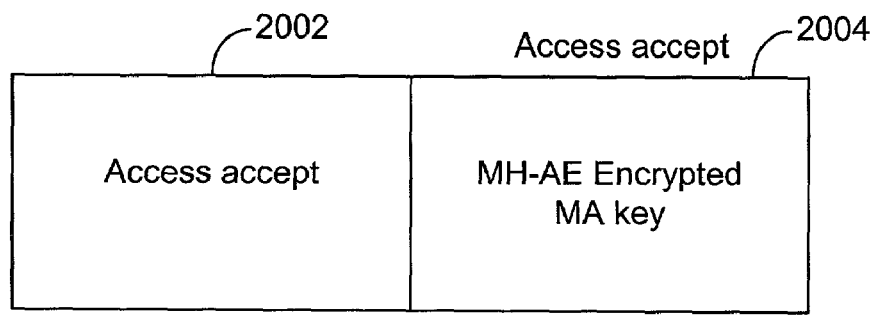
FIG. 20 is a diagram illustrating an exemplary access accept that may be constructed and sent by a AAA server as shown at blocks 524-526 of FIG. 5.

FIG. 20 is a diagram illustrating an exemplary access accept that may be constructed and sent by a AAA server as shown at blocks 524-526 of FIG. 5. Access accept packet 2002 includes a MHAE authentication extension 2004 including the encrypted shared key (e.g., MA key).

Figure 21:
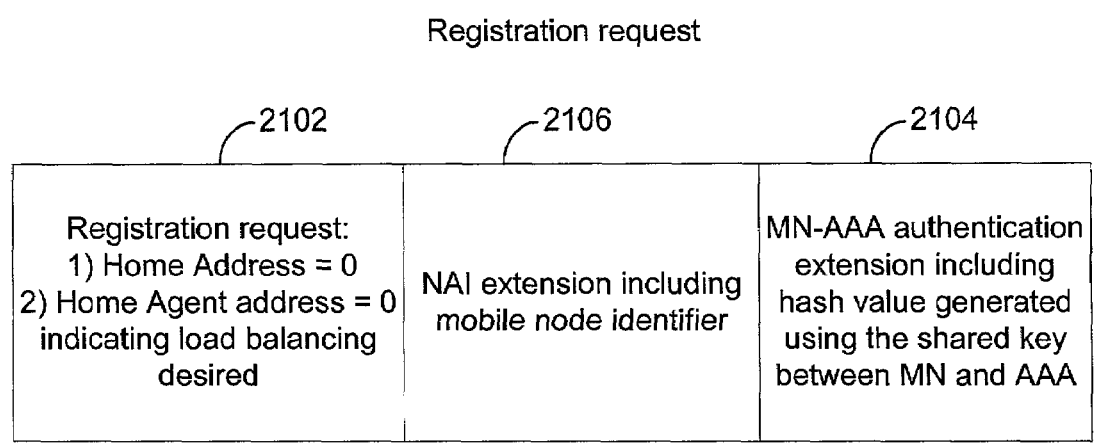
FIG. 21 is a diagram illustrating an exemplary registration request that may be sent by a mobile node as shown at block 604 of FIG. 6A.

As described above with reference to FIG. 6A and FIG. 6B, when the Mobility Agent and the mobile node are in the same zone, the mobile node may register with an assigned Home Agent via the Mobility Agent. FIG. 21 is a diagram illustrating an exemplary registration request that may be sent by a mobile node as shown at block 604 of FIG. 6A. Registration request 2102 includes a Home Address field equal to zero, indicating that an IP address is requested. In addition, Home Agent address field having a value equal to zero indicates that load balancing is desired through the assignment of a Home Agent. MN-AAA authentication extension 2104 includes a hash value generated using the shared key that is shared between the mobile node and the AAA server. NAI extension 2106 includes a mobile node identifier for identifying the mobile node until it has been assigned an IP address.

Figure 22:
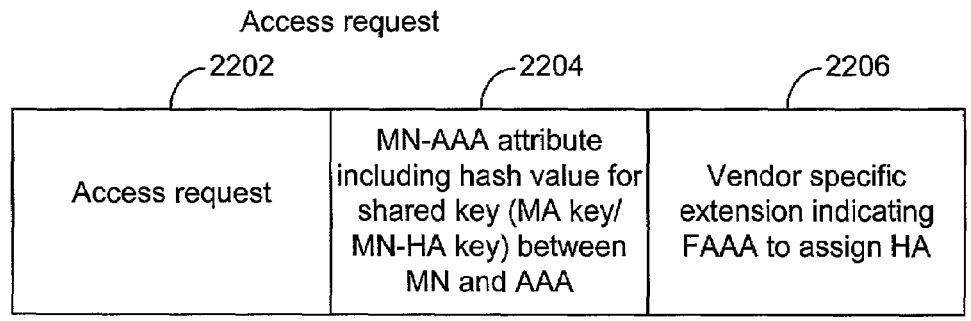
FIG. 22 is a diagram illustrating an exemplary access request that may be constructed and sent by a Mobility Agent to a AAA server as shown at blocks 608-610 of FIG. 6A.

FIG. 22 is a diagram illustrating an exemplary access request that may be constructed and sent by a Mobility Agent to a AAA server as shown at blocks 608-610 of FIG. 6A. Access request packet 2202 includes a MN-AAA attribute 2204 including a hash value for the shared key that is shared between the mobile node and the AAA server (and the Mobility Agent). Vendor specific extension 2206 indicates that a Home Agent is to be assigned (e.g., by the Foreign AAA server).

Figure 23:
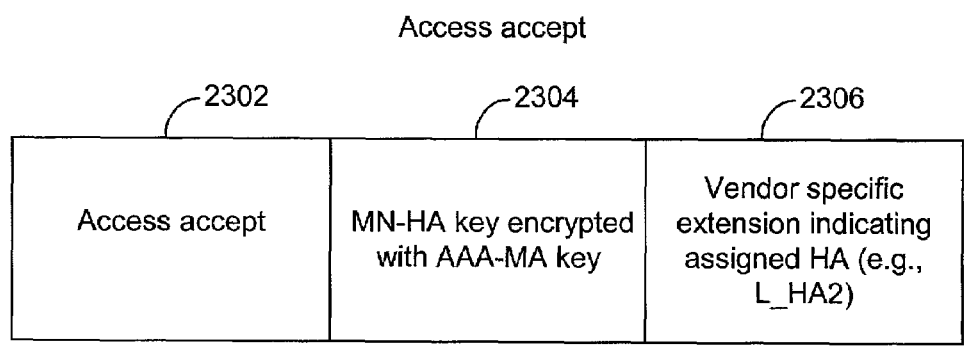
FIG. 23 is a diagram illustrating an exemplary access accept that may be constructed and sent by a AAA server as shown at blocks 624-628 of FIG. 6A.

FIG. 23 is a diagram illustrating an exemplary access accept that may be constructed and sent by a AAA server as shown at blocks 624-628 of FIG. 6A. Access accept packet 2302 includes MHAE extension 2304 including MN-HA key that is shared by the mobile node and the Home Agent, which is encrypted with AAA-MA key shared by the AAA server and the Mobility Agent. Vendor specific extension 2306 identifies the assigned Home Agent, such as local Home Agent L_HA2.

FIG. 24 is a diagram illustrating an exemplary registration reply that may be composed and sent by a Mobility Agent as shown at block 632 of FIG. 6A. Registration reply 2402 includes Home Agent field identifying the assigned Home Agent (e.g., LHA2). Registration reply error code 2404 indicates that the mobile node needs to obtain the assigned Home Agent identifier and use this Home Agent identifier in subsequent registration requests. MHAE 2406 includes a hash value generated using the MA key, to be used for authentication purposes.

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 25:
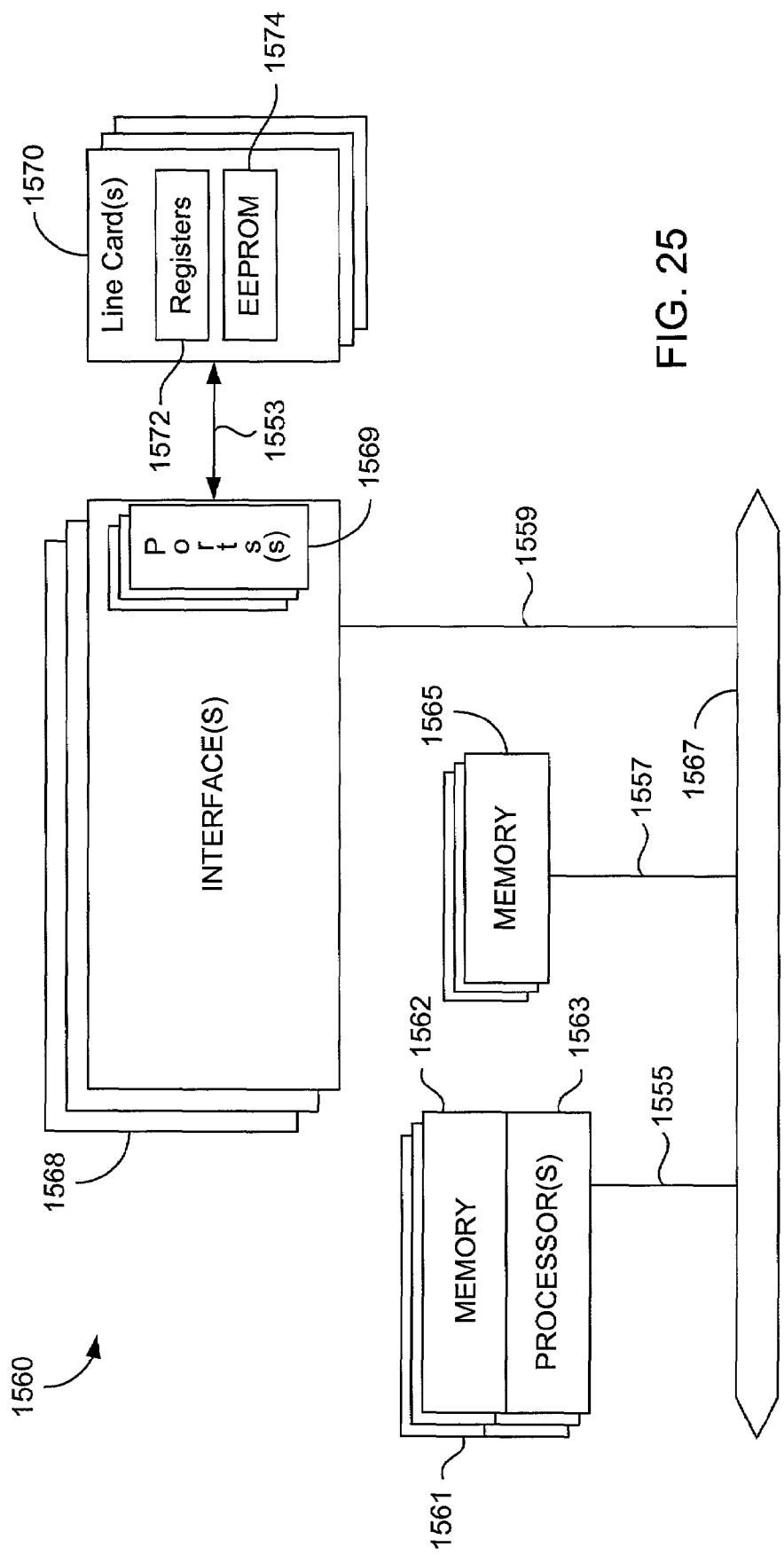
FIG. 25 is a diagram illustrating an exemplary network device in which embodiments of the invention may be implemented.

Referring now to FIG. 25, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 25 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented to enable a mobile node to be dynamically assigned a Home Agent, as well as enable a shared key to be provided to the mobile node and/or the appropriate Mobility Agents (e.g., Home Agents). However, it should be understood that the invention is not limited to such implementations, but instead would equally apply regardless of the context and system in which it is implemented. Thus, broadly speaking, the operations described above may be used to enable dynamic assignment with respect to other mobility agents, such as Foreign Agents. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. In a Mobility Agent supporting Mobile IP, a method of registering a Mobile Node, comprising:

receiving a Mobile IP registration request packet from the Mobile Node indicating that a key to be shared by the Mobile Node and an agent with which the Mobile Node is registering is requested for purposes of registering the Mobile Node with the agent, wherein the agent with which the Mobile Node is registering is a Home Agent that is dynamically assigned to the Mobile Node;

obtaining a key to be shared by the Mobile Node and the agent with which the Mobile Node is registering in response to receiving the Mobile IP registration request packet;

storing the key to be shared by the Mobile Node and the agent with which the Mobile Node is registering; and sending a Mobile IP registration reply packet to the mobile node including the key to be shared by the Mobile Node and the agent with which the Mobile Node is registering, thereby enabling the Mobile Node to register with the agent, wherein the Mobile IP registration reply packet indicates that the Mobile node needs to register with the agent using the key to be shared by the Mobile Node and the agent with which the Mobile Node is registering.

2. In a Mobile Node, a method of registering with an agent supporting Mobile IP, comprising:

composing a Mobile IP registration request having a key request extension requesting a key to be shared by the Mobile Node and the agent with which the Mobile Node is registering;

sending the Mobile IP registration request to a Mobility Agent supporting Mobile IP;

receiving a Mobile IP registration reply from the Mobility Agent, the Mobile IP registration reply indicating that the Mobile Node needs to re-register with the agent with which the Mobile Node is registering using the key to be shared by the Mobile Node and the agent with which the Mobile Node is registering, wherein the Mobile IP registration reply includes a key reply extension including the key to be shared by the Mobile Node and the agent with which the Mobile Node is registering, wherein the agent with which the Mobile Node is registering is a Home Agent that is dynamically assigned to the Mobile Node;

obtaining the key to be shared by the Mobile Node and the agent with which the Mobile Node is registering from the key reply extension of the Mobile IP registration reply; and storing the key to be shared by the Mobile Node and the agent with which the Mobile Node is registering, thereby enabling the Mobile Node to subsequently register directly with the agent.

3. In a Mobile Node, a method of registering with an agent supporting Mobile IP, comprising:

composing a first Mobile IP registration request that requests that a Home Agent be dynamically assigned to the Mobile Node;

sending the first Mobile IP registration request to a Mobility Agent supporting Mobile IP; and receiving a Mobile IP registration reply from the Mobility Agent, the Mobile IP registration reply identifying a Home Agent that has been dynamically assigned to the Mobile Node;

wherein the Mobile IP registration reply further identifies a key to be shared by the Mobile Node and the Home Agent that has been assigned to the Mobile Node, thereby enabling the Mobile Node to subsequently register directly with the Home Agent that has been assigned to the Mobile Node using the key to be shared by the Mobile Node and the Home Agent.

4. The method as recited in claim 3, further comprising:

obtaining the key to be shared by the Mobile Node and the Home Agent that has been assigned to the Mobile Node from the Mobile IP registration reply;

composing a second Mobile IP registration request including the key to be shared by the Mobile Node and the Home Agent that has been assigned to the Mobile node; and sending the second Mobile IP registration request to the Home Agent that has been assigned to the Mobile Node.

5. In a Mobility Agent supporting Mobile IP, a method of registering a Mobile Node, comprising:

receiving a Mobile IP registration request packet from the Mobile Node indicating that a Home Agent with which the Mobile Node is to register is to be assigned to the Mobile Node;

obtaining a Home Agent assignment, the Home Agent assignment identifying the Home Agent with which the Mobile Node is to register; and sending a Mobile IP registration reply packet to the Mobile Node identifying the Home Agent with which the Mobile Node is to register and including a key to be shared by the Mobile node and the Home Agent with which the Mobile Node is to register;

wherein the Mobile IP registration reply packet further indicates that the Mobile node needs to register with the Home Agent using the key to be shared by the Mobile Node and the Home Agent with which the Mobile Node is registering.

6. A Mobility Agent supporting Mobile IP, the Mobility Agent being adapted for registering a Mobile Node, comprising:

a processor; and a memory, at least one of the processor or the memory being adapted for:

receiving a Mobile IP registration request packet from the Mobile Node indicating that a key to be shared by the Mobile Node and an agent with which the Mobile Node is registering is requested for purposes of registering the Mobile Node with the agent, wherein the agent with which the Mobile Node is registering is a Home Agent that is dynamically assigned to the Mobile Node;

obtaining a key to be shared by the Mobile Node and the agent with which the Mobile Node is registering in response to receiving the Mobile IP registration request packet;

storing the key to be shared by the Mobile Node and the agent with which the Mobile Node is registering; and sending a Mobile IP registration reply packet to the mobile node including the key to be shared by the Mobile Node and the agent with which the Mobile Node is registering, thereby enabling the Mobile Node to register with the agent, wherein the Mobile IP registration reply packet indicates that the Mobile node needs to register with the agent using the key to be shared by the Mobile Node and the agent with which the Mobile Node is registering.

7. The Mobility Agent as recited in claim 6, wherein the agent with which the Mobile Node is registering is the Mobility Agent, at least one of the processor or the memory being further adapted for:

creating a registration entry for the Mobile Node in a mobility binding table.

8. The Mobility Agent as recited in claim 6, wherein obtaining a key to be shared by the Mobile Node and the agent with which the Mobile Node is registering comprises:

composing a request packet including authentication information associated with the Mobile Node and a key request indicating that a key to be shared by the Mobile Node and the agent with which the Mobile Node is registering is requested;

sending the request packet to a network device adapted for authenticating the Mobile Node; and receiving a reply packet from the network device in response to the key request, the reply packet including a key to be shared by the Mobile Node and the agent with which the Mobile Node is registering.

9. The Mobility Agent as recited in claim 8, wherein the network device is on a home network associated with the Mobile Node and wherein the Mobility Agent is on a foreign network to which the Mobile Node has roamed.

10. The Mobility Agent as recited in claim 8, wherein the network device is a AAA server, wherein the request packet including the authentication information and the key request is a RADIUS access request packet, the RADIUS access request packet including an authentication attribute having the authentication information and a key request attribute having the key request.

11. The Mobility Agent as recited in claim 8, wherein the network device is an AAA server, wherein the reply packet is a RADIUS access accept packet, the RADIUS access accept packet including the key to be shared by the Mobile Node and the agent with which the Mobile Node is registering.

12. The Mobility Agent as recited in claim 8, the reply packet including a first key to be provided to the agent with which the Mobile Node is registering and a second key to be provided to the Mobile Node, wherein the first key and the second key are each the key to be shared by the Mobile Node and the agent with which the Mobile Node is registering.

13. The Mobility Agent as recited in claim 12, at least one of the processor or the memory being further adapted for:

obtaining the second key to be provided to the Mobile Node from the reply packet; and composing the Mobile IP registration reply packet, the Mobile IP registration reply packet comprising the second key to be provided to the Mobile Node.

14. The Mobility Agent as recited in claim 13, wherein the Mobile IP registration reply packet further comprises a hash of the Mobile IP registration reply packet using the first key to be provided to the agent, the hash of the Mobile IP registration reply packet being provided in a first extension to the Mobile IP registration reply packet and the second key being provided in a second extension to the Mobile IP registration reply packet.

15. The Mobility Agent as recited in claim 12, wherein the agent is the Mobility Agent, at least one of the processor or the memory being further adapted for:

decrypting the first key to be provided to the agent.

16. The Mobility Agent as recited in claim 6, wherein the Mobility Agent is adapted for functioning as a Foreign Agent and a Home Agent, at least one of the processor or the memory being adapted for:

sending an agent advertisement indicating that the Mobility Agent is configured for functioning as a Home Agent and a Foreign Agent.

17. The Mobility Agent as recited in claim 16, wherein the agent advertisement further indicates an authentication domain associated with the Mobility Agent.

18. The Mobility Agent as recited in claim 16, wherein the agent advertisement further indicates that the Mobile Node should obtain an IP address from a DHCP server.

19. The Mobility Agent as recited in claim 16, wherein the agent advertisement further indicates that the Mobile Node should obtain an IP address from the agent with which the Mobile Node is registering.

20. The Mobility Agent as recited in claim 16, wherein the agent advertisement further indicates that the Mobile Node should obtain an IP address via the Mobility Agent.

21. The Mobility Agent as recited in claim 6, wherein the agent with which the Mobile Node is registering is a Home Agent on a network to which the Mobile Node has roamed.

22. The Mobility Agent as recited in claim 6, wherein the Mobile IP registration request packet indicates that the agent with which the Mobile Node is registering is a Home Agent to be dynamically assigned to the Mobile Node and the Mobile IP registration reply packet identifies the agent with which the Mobile Node is registering.

23. The Mobility Agent as recited in claim 22, wherein the Mobile IP registration reply packet further indicates that the agent is to be used by the Mobile Node in subsequent registration requests.

24. The Mobility Agent as recited in claim 22, wherein the Mobile IP registration reply packet indicates that the Mobile Node is to obtain the agent from the Mobile IP registration reply packet.

25. The Mobility Agent as recited in claim 22, wherein the agent is a Home Agent on a network to which the Mobile Node has roamed.

26. The Mobility Agent as recited in claim 22, wherein the Mobile IP registration reply packet indicates that the Mobile Node needs to re-register with the agent with the key.

27. The Mobility Agent as recited in claim 26, at least one of the processor or the memory being further adapted for:

receiving a second Mobile IP registration request from the Mobile Node, the second Mobile IP registration request being addressed to the agent with which the Mobile Node is registering;

appending a key reply extension to the second Mobile IP registration request, the key reply extension including the key; and forwarding the second Mobile IP registration request to the agent with which the Mobile Node is registering.

28. The Mobility Agent as recited in claim 27, at least one of the processor or the memory being further adapted for:

receiving a second Mobile IP registration reply from the agent with which the Mobile Node is registering;

removing the key to be shared by the Mobile Node and the agent with which the Mobile Node is registering from storage; and forwarding the second Mobile IP registration reply to the Mobile Node.

29. A computer-readable medium storing thereon computer readable instructions for registering a Mobile Node in a Mobility Agent supporting Mobile IP, comprising:

instructions for receiving a Mobile IP registration request packet from the Mobile Node indicating that a key to be shared by the Mobile Node and an agent with which the Mobile Node is registering is requested for purposes of registering the Mobile Node with the agent, wherein the agent with which the Mobile Node is registering is a Home Agent that is dynamically assigned to the Mobile Node;

instructions for obtaining a key to be shared by the Mobile Node and the agent with which the Mobile Node is registering in response to receiving the Mobile IP registration request packet;

instructions for storing the key to be shared by the Mobile Node and the agent with which the Mobile Node is registering; and instructions for sending a Mobile IP registration reply packet to the mobile node including the key to be shared by the Mobile Node and the agent with which the Mobile Node is registering, thereby enabling the Mobile Node to register with the agent, wherein the Mobile IP registration reply packet indicates that the Mobile node needs to register with the agent using the key to be shared by the Mobile Node and the agent with which the Mobile Node is registering.

30. An apparatus adapted for registering a Mobile Node in a Mobility Agent supporting Mobile IP, comprising:

means for receiving a Mobile IP registration request packet from the Mobile Node indicating that a key to be shared by the Mobile Node and an agent with which the Mobile Node is registering is requested for purposes of registering the Mobile Node with the agent, wherein the agent with which the Mobile Node is registering is a Home Agent that is dynamically assigned to the Mobile Node;

means for obtaining a key to be shared by the Mobile Node and the agent with which the Mobile Node is registering in response to receiving the Mobile IP registration request packet;

means for storing the key to be shared by the Mobile Node and the agent with which the Mobile Node is registering; and means for sending a Mobile IP registration reply packet to the mobile node including the key to be shared by the Mobile Node and the agent with which the Mobile Node is registering, thereby enabling the Mobile Node to register with the agent, wherein the Mobile IP registration reply packet indicates that the Mobile node needs to register with the agent using the key to be shared by the Mobile Node and the agent with which the Mobile Node is registering.

31. A computer-readable medium storing thereon computer readable instructions for registering a Mobile Node with an agent supporting Mobile IP, comprising:

instructions for composing a Mobile IP registration request having a key request extension requesting a key to be shared by the Mobile Node and the agent with which the Mobile Node is registering;

instructions for sending the Mobile IP registration request to a Mobility Agent supporting Mobile IP;

instructions for receiving a Mobile IP registration reply from the Mobility Agent, the registration reply indicating that the Mobile Node needs to register with the agent with which the Mobile Node is registering using the key to be shared by the Mobile Node and the agent with which the Mobile Node is registering, wherein the Mobile IP registration reply includes a key reply extension including the key to be shared by the Mobile Node and the agent with which the Mobile Node is registering, wherein the agent with which the Mobile Node is registering is a Home Agent that is dynamically assigned to the Mobile Node;

instructions for obtaining the key to be shared by the Mobile Node and the agent with which the Mobile Node is registering from the key reply extension of the Mobile IP registration reply; and instructions for storing the key to be shared by the Mobile Node and the agent with which the Mobile Node is registering, thereby enabling the Mobile Node to subsequently register directly with the agent.

32. A Mobile Node adapted for registering with an agent supporting Mobile IP, comprising:

means for composing a Mobile IP registration request having a key request extension requesting a key to be shared by the Mobile Node and the agent with which the Mobile Node is registering, wherein the agent with which the Mobile Node is registering is a Home Agent;

means for sending the Mobile IP registration request to a Mobility Agent supporting Mobile IP;

means for receiving a Mobile IP registration reply from the Mobility Agent, the Mobile IP registration reply indicating that the Mobile Node needs to register with the agent with which the Mobile Node is registering using the key to be shared by the Mobile Node and the agent with which the Mobile Node is registering, wherein the Mobile IP registration reply includes a key reply extension including the key to be shared by the Mobile Node and the agent with which the Mobile Node is registering, wherein the agent with which the Mobile Node is registering is a Home Agent that is dynamically assigned to the Mobile Node;

means for obtaining the key to be shared by the Mobile Node and the agent with which the Mobile Node is registering from the key reply extension of the Mobile IP registration reply; and means for storing the key to be shared by the Mobile Node and the agent with which the Mobile Node is registering, thereby enabling the Mobile Node to subsequently register directly with the agent.

33. A Mobile Node adapted for registering with an agent supporting Mobile IP, comprising:

a processor; and a memory, at least one of the processor or the memory being adapted for:

composing a Mobile IP registration request having a key request extension requesting a key to be shared by the Mobile Node and the agent with which the Mobile Node is registering, wherein the agent with which the Mobile Node is registering is a Home Agent;

sending the Mobile IP registration request to a Mobility Agent supporting Mobile IP;

receiving a Mobile IP registration reply from the Mobility Agent, the registration reply indicating that the Mobile Node needs to register with the agent with which the Mobile Node is registering using the key to be shared by the Mobile Node and the agent with which the Mobile Node is registering, wherein the Mobile IP registration reply includes a key reply extension including the key to be shared by the Mobile Node and the agent with which the Mobile Node is registering, wherein the agent with which the Mobile Node is registering is a Home Agent that is dynamically assigned to the Mobile Node;

obtaining the key to be shared by the Mobile Node and the agent with which the Mobile Node is registering from the key reply extension of the Mobile IP registration reply; and storing the key to be shared by the Mobile Node and the agent with which the Mobile Node is registering, thereby enabling the Mobile Node to subsequently register directly with the agent.

34. The Mobile Node as recited in claim 33, wherein the agent with which the Mobile node is registering is the Mobility Agent.

35. The Mobile Node as recited in claim 33, at least one of the processor or the memory being further adapted for:

receiving an agent advertisement indicating an authentication domain associated with the Mobility Agent; and determining whether the authentication domain associated with the Mobility Agent is different from that of the Mobile Node;

wherein composing a Mobile IP registration request having a key request extension is performed when it is determined that the authentication domain associated with the Mobility Agent is different from that of the Mobile Node.

36. The Mobile Node as recited in claim 35, wherein the agent advertisement further indicates that the Mobile Node should obtain an IP address from a DHCP server, the method further comprising:

obtaining an IP address from a DHCP server.

37. The Mobile Node as recited in claim 35, wherein the agent advertisement further indicates that the Mobile Node should obtain an IP address from the Mobility Agent, at least one of the processor or the memory being further adapted for:

obtaining an IP address from the Mobility Agent.

38. The Mobile Node as recited in claim 33, wherein the Mobility Agent is configured for functioning as a Home Agent and a Foreign Agent, at least one of the processor or the memory being further adapted for:

receiving an agent advertisement from the Mobility Agent indicating that the Mobility Agent is configured for functioning as a Home Agent and a Foreign Agent.

39. The Mobile Node as recited in claim 33, at least one of the processor or the memory being further adapted for:

sending a subsequent Mobile IP registration request to the agent including a value associated with the key to be shared by the Mobile Node and the agent with which the Mobile Node is registering.

40. The Mobile Node as recited in claim 39, wherein the subsequent Mobile IP registration request comprises an authentication extension including a hash value of the key to be shared by the Mobile Node and the agent with which the Mobile Node is registering.

41. The Mobile Node as recited in claim 33, the Mobile IP registration reply further comprising an authentication extension, at least one of the processor or the memory being further adapted for:

authenticating the Mobile IP registration reply using the authentication extension and the key to be shared by the Mobile Node and the agent with which the Mobile Node is registering, thereby verifying that the Mobile Node and the agent with which the Mobile node is registering both share the key to be shared by the Mobile Node and the agent with which the Mobile Node is registering.

42. The Mobile Node as recited in claim 33, wherein the agent with which the Mobile Node is registering is a Home Agent on a network to which the Mobile Node has roamed.

43. The Mobile Node as recited in claim 33, wherein the agent with which the Mobile Node is registering is a Home Agent to be dynamically assigned to the Mobile Node.

44. A computer-readable medium storing thereon computer-readable instructions for registering a Mobile Node with an agent supporting Mobile IP, comprising:

instructions for composing a first Mobile IP registration request that requests that a Home Agent be dynamically assigned to the Mobile Node;

instructions for sending the first Mobile IP registration request to a Mobility Agent supporting Mobile IP;

instructions for processing a Mobile IP registration reply received from the Mobility Agent, the registration reply identifying a Home Agent that has been assigned to the Mobile Node;

wherein the Mobile IP registration reply further identifies a key to be shared by the Mobile Node and the Home Agent that has been assigned to the Mobile Node, thereby enabling the Mobile Node to subsequently register directly with the Home Agent that has been assigned to the Mobile Node;

instructions for composing a second Mobile IP registration request using the key to be shared by the Mobile Node and the Home Agent that has been assigned to the Mobile Node; and instructions for sending the second Mobile IP registration request to the Home Agent that has been assigned to the Mobile Node.

45. A Mobile Node adapted for registering with an agent supporting Mobile IP, comprising:

means for composing a first Mobile IP registration request that requests that a Home Agent be dynamically assigned to the Mobile Node;

means for sending the first Mobile IP registration request to a Mobility Agent supporting Mobile IP;

means for receiving a Mobile IP registration reply from the Mobility Agent, the registration reply identifying a Home Agent that has been assigned to the Mobile Node;

wherein the Mobile IP registration reply further identifies a key to be shared by the Mobile Node and the Home Agent that has been assigned to the Mobile Node, thereby enabling the Mobile Node to subsequently register directly with the Home Agent that has been assigned to the Mobile Node;

means for composing a second Mobile IP registration request using the key to be shared by the Mobile Node and the Home Agent that has been assigned to the Mobile Node; and means for sending the second Mobile IP registration request to the Home Agent that has been assigned to the Mobile Node.

46. A Mobile Node adapted for registering with an agent supporting Mobile IP, comprising:

a processor; and a memory, at least one of the processor or the memory being adapted for:

composing a first Mobile IP registration request that requests that a Home Agent be dynamically assigned to the Mobile Node;

sending the first Mobile IP registration request to a Mobility Agent supporting Mobile IP;

receiving a Mobile IP registration reply from the Mobility Agent, the Mobile IP registration reply identifying a Home Agent that has been assigned to the Mobile Node;

wherein the Mobile IP registration reply further identifies a key to be shared by the Mobile Node and the Home Agent that has been assigned to the Mobile Node, thereby enabling the Mobile Node to subsequently register directly with the Home Agent that has been assigned to the Mobile Node;

obtaining the key to be shared by the Mobile Node and the Home Agent that has been assigned to the Mobile Node from the Mobile IP registration reply;

composing a second Mobile IP registration request using the key to be shared by the Mobile Node and the Home Agent that has been assigned to the Mobile Node; and sending the second Mobile IP registration request to the Home Agent that has been assigned to the Mobile Node.

47. The Mobile Node as recited in claim 46, wherein the first Mobile IP registration request further indicates that a key to be shared by the Mobile Node and the Home Agent be generated.

48. A computer-readable medium storing thereon instructions for registering a Mobile Node by a Mobility Agent supporting Mobile IP, comprising:

instructions for receiving a Mobile IP registration request packet from the Mobile Node indicating that a Home Agent with which the Mobile Node is to register is to be assigned to the Mobile Node;

instructions for obtaining a Home Agent assignment, the Home Agent assignment identifying the Home Agent with which the Mobile Node is to register; and instructions for sending a Mobile IP registration reply packet to the Mobile Node identifying the Home Agent with which the Mobile Node is to register and including a key to be shared by the Mobile node and the Home Agent with which the Mobile Node is to register;

wherein the Mobile IP registration reply packet further indicates that the Mobile node needs to register with the Home Agent using the key to be shared by the Mobile Node and the Home Agent with which the Mobile Node is registering.

49. A Mobility Agent supporting Mobile IP and adapted for registering a Mobile Node, comprising:

means for receiving a Mobile IP registration request packet from the Mobile Node indicating that a Home Agent with which the Mobile Node is to register is to be assigned to the Mobile Node;

means for obtaining a Home Agent assignment, the Home Agent assignment identifying the Home Agent with which the Mobile Node is to register; and means for sending a Mobile IP registration reply packet to the Mobile Node identifying the Home Agent with which the Mobile Node is to register and including a key to be shared by the Mobile node and the Home Agent with which the Mobile Node is to register;

wherein the Mobile IP registration reply packet further indicates that the Mobile node needs to register with the Home Agent using the key to be shared by the Mobile Node and the Home Agent with which the Mobile Node is registering.

50. A Mobility Agent supporting Mobile IP and adapted for registering a Mobile Node, comprising:

a processor; and a memory, at least one of the processor or the memory being adapted for:

receiving a Mobile IP registration request packet from the Mobile Node indicating that a Home Agent with which the Mobile Node is to register is to be assigned to the Mobile Node;

obtaining a Home Agent assignment, the Home Agent assignment identifying the Home Agent with which the Mobile Node is to register; and sending a Mobile IP registration reply packet to the Mobile Node identifying the Home Agent with which the Mobile Node is to register and including a key to be shared by the Mobile node and the Home Agent with which the Mobile Node is to register;

wherein the Mobile IP registration reply packet further indicates that the Mobile node needs to register with the Home Agent using the key to be shared by the Mobile Node and the Home Agent with which the Mobile Node is registering.

51. The Mobility Agent as recited in claim 50, wherein the Home Agent with which the Mobile Node is registering is the Mobility Agent, at least one of the processor or the memory being further adapted for:

creating a registration entry for the Mobile Node in a mobility binding table.

52. The Mobility Agent as recited in claim 50, wherein obtaining a Home Agent assignment comprises:

composing a request packet including authentication information associated with the Mobile Node and indicating that a Home Agent with which the Mobile Node is registering is to be assigned to the Mobile Node sending the request packet to a network device adapted for authenticating the Mobile Node; and receiving a reply packet from the network device, the reply packet identifying the Home Agent with which the Mobile Node is registering.

53. The Mobility Agent as recited in claim 52, wherein the network device is a AAA server, wherein the request packet is a RADIUS access request packet, the RADIUS access request packet including an authentication attribute having the authentication information and an attribute indicating that a Home Agent is to be assigned to the Mobile Node.

54. The Mobility Agent as recited in claim 52, wherein the network device is an AAA server, wherein the reply packet is a RADIUS access accept packet, the RADIUS access accept packet identifying the Home Agent.

55. The Mobility Agent as recited in claim 50, wherein the Mobility Agent is adapted for functioning as a Foreign Agent and a Home Agent, at least one of the processor or the memory being further adapted for:

sending an agent advertisement indicating that the Mobility Agent is configured for functioning as a Home Agent and a Foreign Agent.

56. The Mobility Agent as recited in claim 55, wherein the agent advertisement further indicates an authentication domain associated with the Mobility Agent.

57. The Mobility Agent as recited in claim 55, wherein the agent advertisement further indicates that the Mobile Node should obtain an IP address via the Mobility Agent.

58. The Mobility Agent as recited in claim 50, the reply packet including a first key to be provided to the Home Agent with which the Mobile Node is registering and a second key to be provided to the Mobile Node, wherein the first key and the second key are each the key to be shared by the Mobile Node and the Home Agent with which the Mobile Node is registering.

59. The Mobility Agent as recited in claim 58, at least one of the processor or the memory being further adapted for:

obtaining the second key to be provided to the Mobile Node from the reply packet; and composing the Mobile IP registration reply packet, the Mobile IP registration reply packet comprising the second key to be provided to the Mobile Node.

60. The Mobility Agent as recited in claim 59, wherein the Mobile IP registration reply packet further comprises a hash of the first key to be provided to the agent, the hash of the first key being provided in a first extension to the Mobile IP registration reply packet and the second key being provided in a second extension to the Mobile IP registration reply packet.

61. The Mobility Agent as recited in claim 58, wherein the Home Agent is the Mobility Agent, at least one of the processor or the memory being further adapted for:
- decrypting the first key to be provided to the Home Agent; and
- storing the first key.

62. The Mobility Agent as recited in claim 50, wherein the Home Agent with which the Mobile Node is registering is a Home Agent on a network to which the Mobile Node has roamed.

63. The Mobility Agent as recited in claim 50, wherein the Mobile IP registration reply packet further indicates that the Home Agent is to be used by the Mobile Node in subsequent Mobile IP registration requests.

64. The Mobility Agent as recited in claim 50, wherein the Mobile IP registration reply packet indicates that the Mobile Node is to identify the Home Agent from the Mobile IP registration reply packet.

65. The Mobility Agent as recited in claim 50, wherein the Mobile IP registration reply packet indicates that the Mobile Node needs to re-register with the Home Agent with the key.

66. The Mobility Agent as recited in claim 65, at least one of the processor or the memory being further adapted for:
- receiving a second Mobile IP registration request from the Mobile Node, the second Mobile IP registration request being addressed to the agent with which the Mobile Node is registering;
- appending a key reply extension to the second Mobile IP registration request, the key reply extension including the key; and
- forwarding the second Mobile IP registration request to the Home Agent with which the Mobile Node is registering.

67. The Mobility Agent as recited in claim 66, at least one of the processor or the memory being further adapted for:
- receiving a second Mobile IP registration reply from the Home Agent with which the Mobile Node is registering;
- removing the key to be shared by the Mobile Node and the Home Agent with which the Mobile Node is registering from storage; and
- forwarding the second Mobile IP registration reply to the Mobile Node.

\* \* \* \* \*